(12) United States Patent
Boodman et al.

(10) Patent No.: US 8,667,487 B1
(45) Date of Patent: Mar. 4, 2014

(54) WEB BROWSER EXTENSIONS

(75) Inventors: Aaron Boodman, San Francisco, CA (US); Erik Kay, Belmont, CA (US); Rafael Weinstein, San Francisco, CA (US); Matthew Perry, Mountain View, CA (US); Antony John Sargent, Mountain View, CA (US)

(73) Assignee: Google Inc., Mountain View, CA (US)

( * ) Notice: Subject to any disclaimer, the term of this patent is extended or adjusted under 35 U.S.C. 154(b) by 212 days.

(21) Appl. No.: 13/110,885

(22) Filed: May 18, 2011

Related U.S. Application Data

(60) Provisional application No. 61/346,013, filed on May 18, 2010, provisional application No. 61/345,999, filed on May 18, 2010, provisional application No. 61/346,000, filed on May 18, 2010.

(51) Int. Cl.
G06F 9/44 (2006.01)
G06F 9/445 (2006.01)
G06F 9/45 (2006.01)

(52) U.S. Cl.
USPC ........... 717/178; 717/101; 717/102; 717/104; 717/109; 717/110; 717/121; 717/124; 717/126; 717/135; 717/170

(58) Field of Classification Search
None
See application file for complete search history.

(56) References Cited

U.S. PATENT DOCUMENTS

| | | | |
|---|---|---|---|
| 6,721,776 B1 * | 4/2004 | Erickson et al. | 717/102 |
| 6,772,339 B1 * | 8/2004 | Jakobsson et al. | 717/126 |
| 6,865,732 B1 * | 3/2005 | Morgan | 717/140 |
| 7,643,982 B2 * | 1/2010 | Sanjar et al. | 717/135 |
| 7,703,022 B2 | 4/2010 | Arthurs et al. | |
| 7,770,151 B2 * | 8/2010 | Sanjar et al. | 717/109 |
| 7,797,678 B2 * | 9/2010 | Moulckers et al. | 717/121 |
| 7,975,308 B1 | 7/2011 | Satish et al. | |
| 8,001,529 B2 * | 8/2011 | Babut et al. | 717/124 |
| 8,200,962 B1 | 6/2012 | Boodman et al. | |
| 2003/0007639 A1 | 1/2003 | Lambert | |
| 2005/0216880 A1 * | 9/2005 | Erickson et al. | 717/101 |
| 2006/0248511 A1 * | 11/2006 | Sanjar et al. | 717/124 |
| 2007/0061800 A1 | 3/2007 | Cheng et al. | |
| 2007/0112944 A1 * | 5/2007 | Zapata et al. | 717/104 |
| 2007/0209006 A1 | 9/2007 | Arthurs et al. | |
| 2008/0184141 A1 | 7/2008 | Selig | |
| 2008/0184148 A1 | 7/2008 | Selig | |

(Continued)

OTHER PUBLICATIONS

Andre Charland et al., Mobile Application Development: Web Vs. Native, 2011, [Retrieved on Oct. 10, 2013]. Retrieved from the internet: <URL: http://dl.acm.org/citation.cfm?id=1941504> 5 Pages (49-53).*

Ralph Mietzner et al., Variability Modeling to Support Customization and Deployment of Multi-Tenant-Aware Software as a Service Applications, 2009, [Retrieved on Oct. 10, 2013]. Retrieved from the internet: <URL:http://dl.acm.org/citation.cfm?id=1564722> 8 Pages (18-25).*

(Continued)

*Primary Examiner* — Don Wong
*Assistant Examiner* — Anibal Rivera
(74) *Attorney, Agent, or Firm* — Brake Hughes Bellermann LLP

(57) ABSTRACT

According to one general aspect, a method of managing a web browser extension by an apparatus may include executing, by a processor included by the apparatus, a web browser. The method may include installing on the apparatus, via the web browser, a web browser extension. In one embodiment, the web browser extension may include at least one web page configured to alter the functionality of the web browser, and a substantially unique identifier (UID) based upon a public encryption key. The method may further include launching, via the web browser, the web browser extension based upon the substantially unique identifier.

20 Claims, 11 Drawing Sheets

(56) References Cited

U.S. PATENT DOCUMENTS

| | | |
|---|---|---|
| 2008/0184157 A1 | 7/2008 | Selig |
| 2008/0184158 A1 | 7/2008 | Selig |
| 2008/0184159 A1 | 7/2008 | Selig |
| 2009/0024953 A1 | 1/2009 | Selig |
| 2009/0100263 A1 | 4/2009 | Leonard |
| 2009/0138699 A1* | 5/2009 | Miyazaki et al. ............. 717/170 |
| 2009/0158035 A1 | 6/2009 | Stultz |
| 2010/0042838 A1 | 2/2010 | Ho |
| 2010/0199169 A1 | 8/2010 | Gnech et al. |
| 2010/0205618 A1 | 8/2010 | Gonzalez et al. |
| 2010/0318989 A1* | 12/2010 | Dureau et al. ................ 717/178 |
| 2011/0145360 A1* | 6/2011 | Sheshagiri et al. ........... 717/110 |

OTHER PUBLICATIONS

"Cryptographic hash function", From Wikipedia, the free encyclopedia, Apr. 13, 2011, 10 pages.

Non-Final Office Action for U.S. Appl. No. 13/246,847, mailed Jan. 17, 2012, 15 pages.

Notice of Allowance for U.S. Appl. No. 13/246,847, mailed Apr. 17, 2012, 9 pages.

Non-Final Office Action Response for U.S. Appl. No. 13/246,847, mailed Feb. 2, 2012, 9 pages.

* cited by examiner

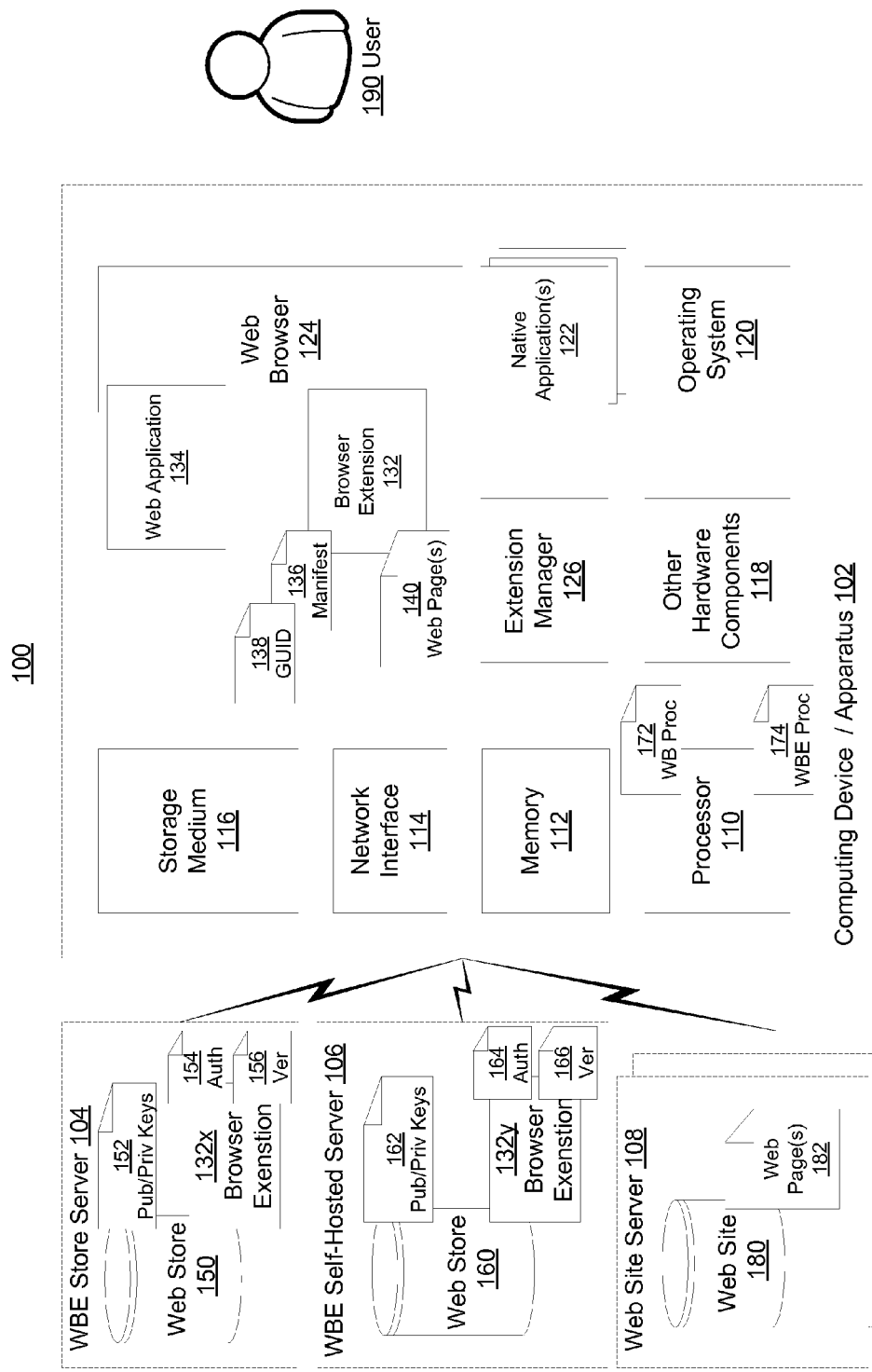

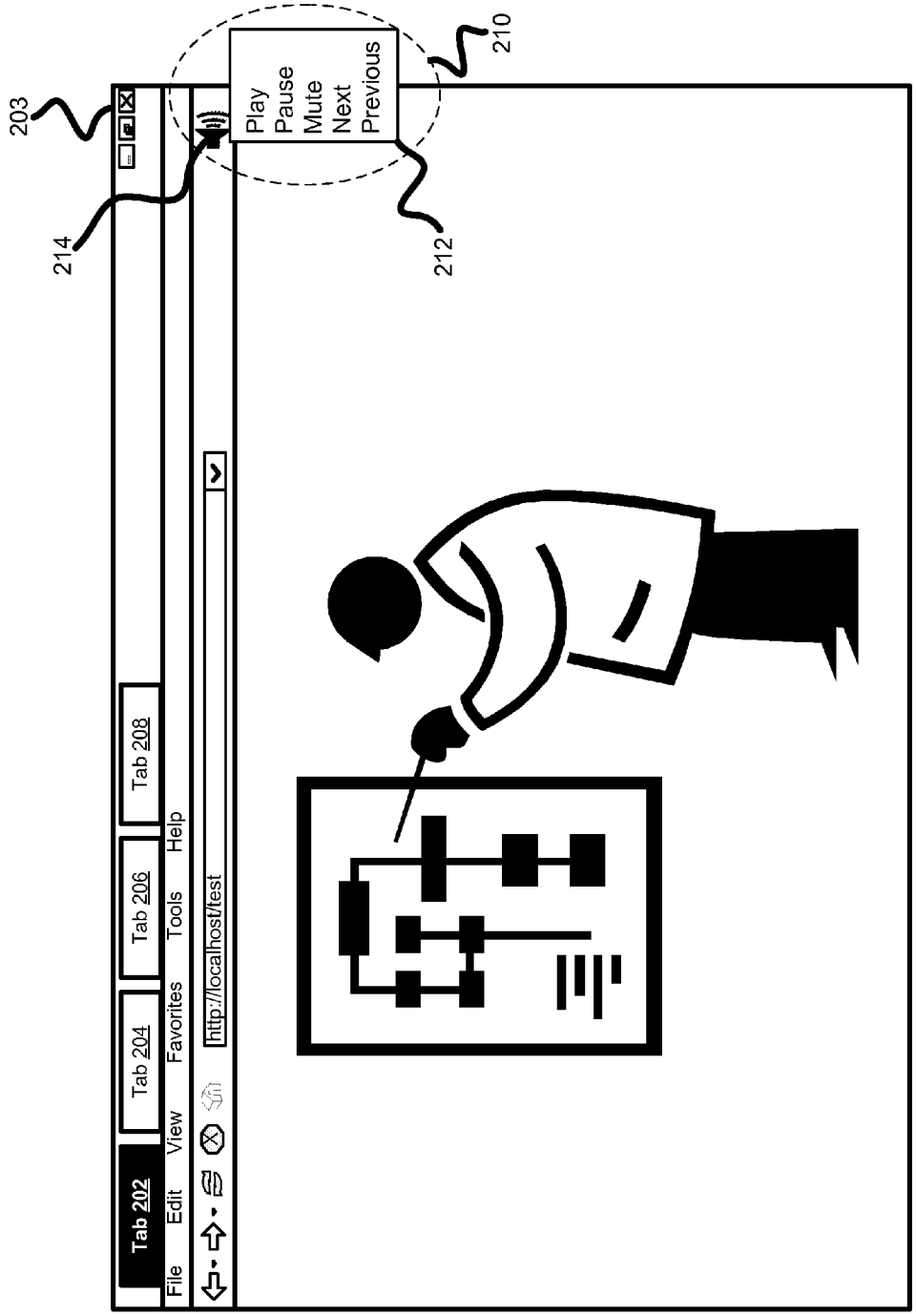

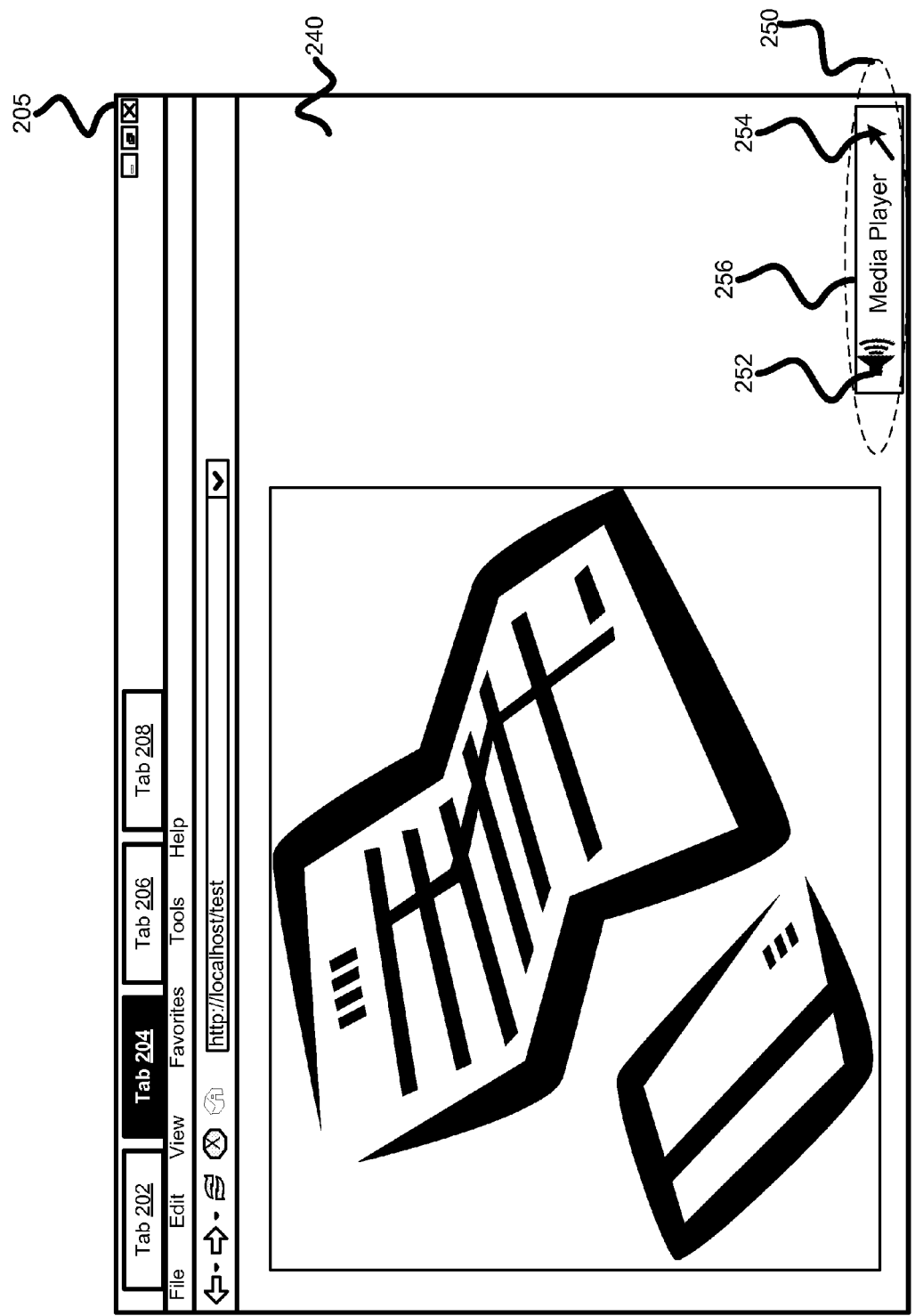

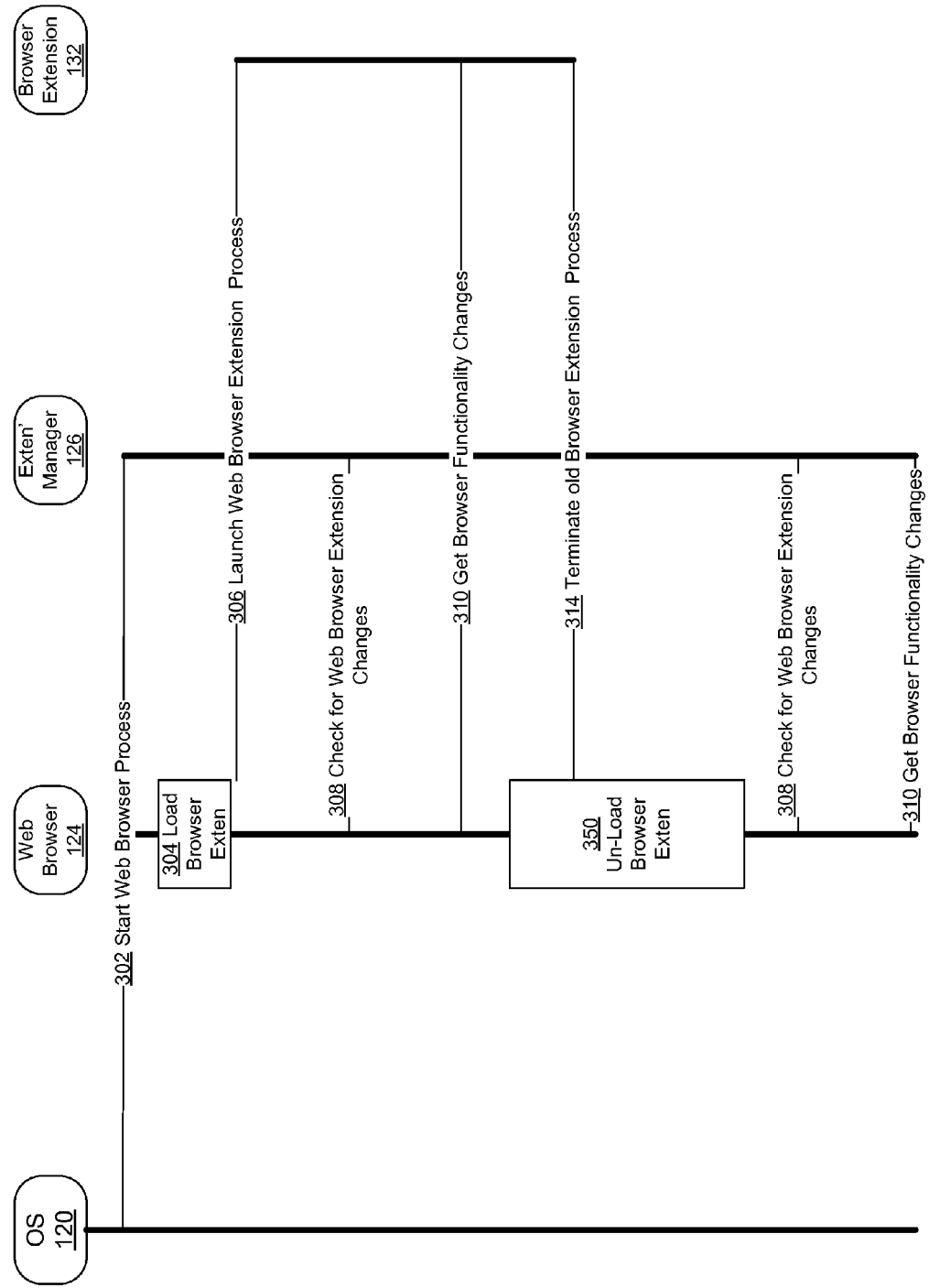

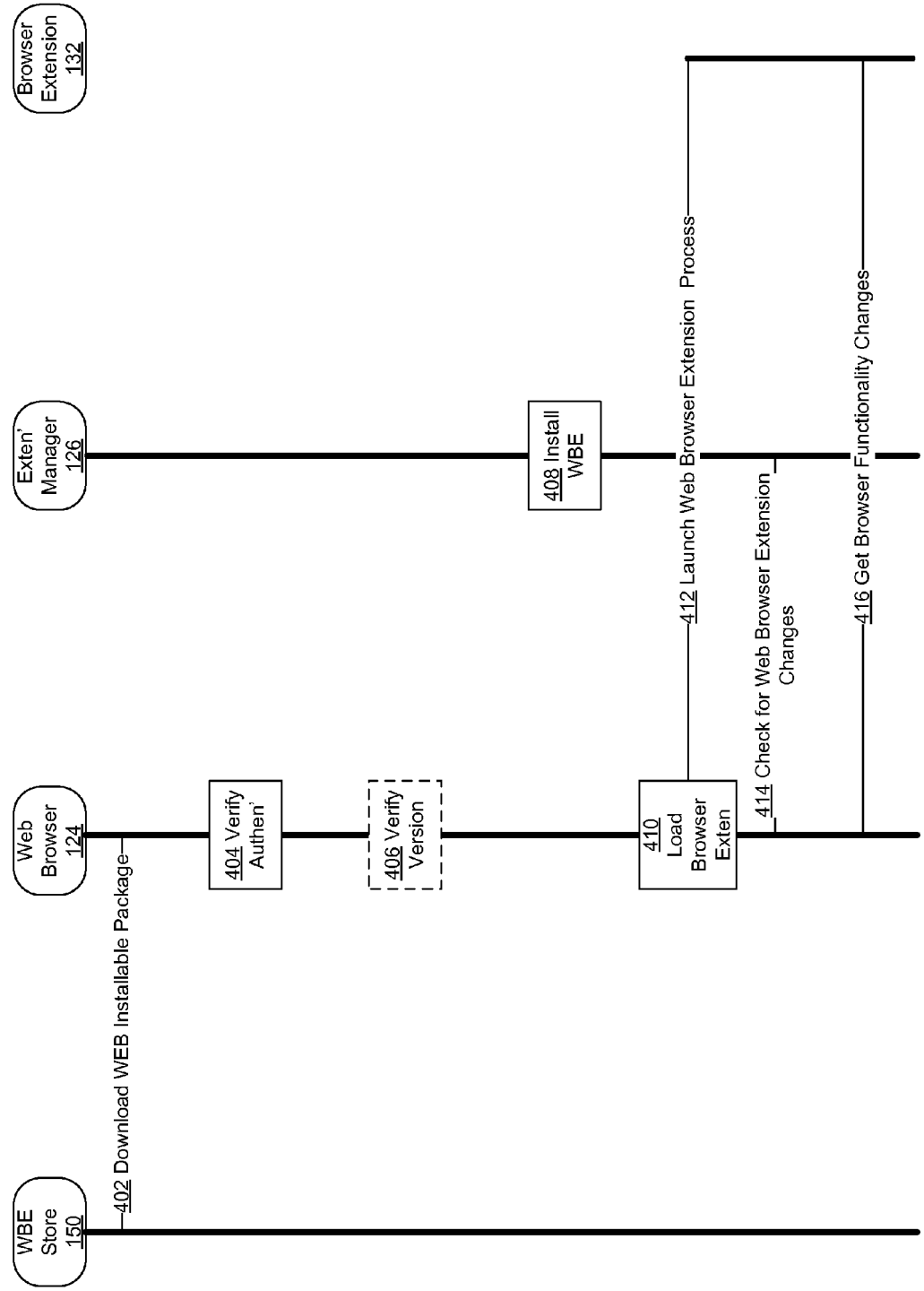

FIG. 6
600

```
<?xml version='1.0' encoding='UTF-8'?>
<gupdate xmlns='http://www.google.com/update2/response' protocol='2.0'>
  <app appid='ababcdfbmnhbkgbeilkpnhgfacdblkdf'>          — 602
    <updatecheck codebase='http://example.com/extension.crx' />   — 604
    <appversion version='2.0' />                          — 606
  </app>
</gupdate>
```

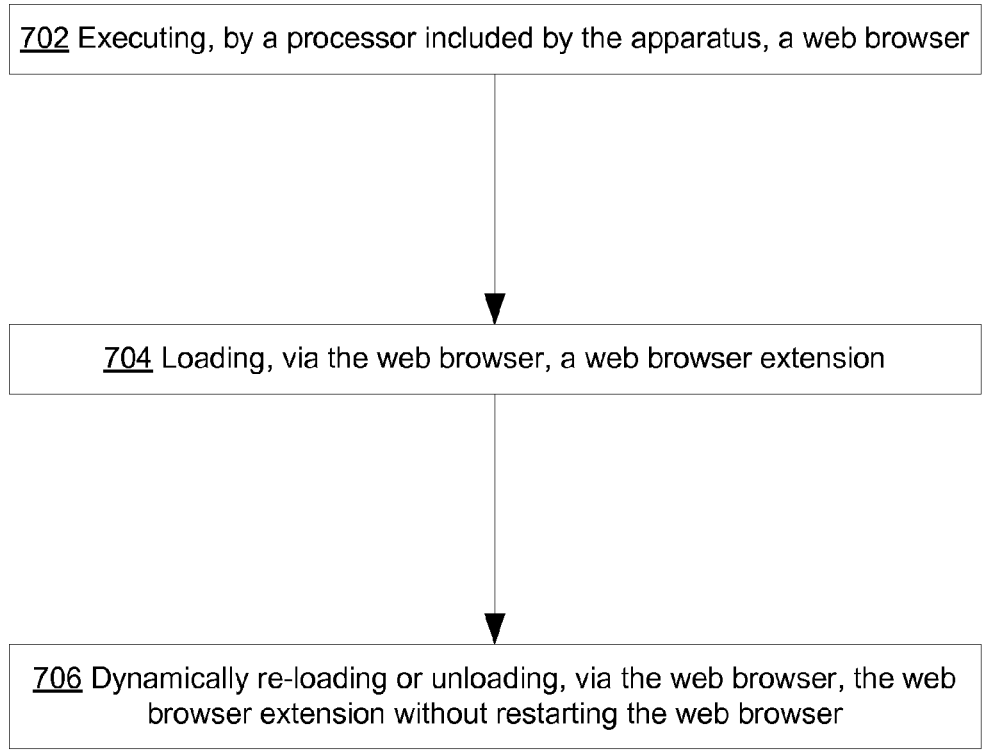

FIG. 8
800

802 Executing, via a processor included by the apparatus, a web browser

▼

804 Installing on the apparatus, via the web browser, a web browser extension.

▼

806 Launching, via the web browser, the web browser extension based upon the substantially unique identifier 808 Receiving a blacklisting message indicating that a blacklisted web browser extension is to be uninstalled

▼

810 Automatically uninstalling the blacklisted web browser extension.

WEB BROWSER EXTENSIONS

CROSS-REFERENCE TO RELATED APPLICATION

This application claims the benefit, under 35 U.S.C. §119, of U.S. Provisional Patent Application No. 61/345,999 "Installable Web Applications", U.S. Provisional Patent Application No. 61/346,000, "Web Store For Digital Goods", and U.S. Provisional Patent Application No. 61/346,013, "Chrome Extensions", all of which were filed on May 18, 2010. The disclosures of these provisional patent applications are incorporated herein by reference in their entirety.

TECHNICAL FIELD

This description relates to extensions that alter the functionality to a web browser.

BACKGROUND

Use of the World Wide Web continues to increase, as does the amount and variety of content that is available to its users. Users of the World Wide Web commonly use browsers (web browsers) implemented on a web-enabled computing device to access content. Such devices include personal computers, laptop computers, netbook computers, smartphones and cell phones, among a number of other possible devices. Such web browsers are configured to read programmatic code and render that code as web pages, which may include rendering both audio and visual content contained in various media files (e.g., image, video and audio files, etc.), as well as performing other functions defined in the programmatic code.

Some browsers allow users to install plug-ins, add-ons, or extensions to the browser, where such extensions add functionality to the browser and operate as an integrated part of the browser. For instance, an extension may provide a user access to its additional functionality by modifying a user-interface (UI) of the browser. As an example, a weather forecast extension may be added to a browser, where the extension provides easy access to weather information by adding an icon or a button to the UI of the browser. A user may then interact with the extension's button or icon (e.g., by clicking it or hovering over it with a pointing device) to obtain weather information, rather than having to browse to a weather related web page in order to obtain weather information.

Browser extensions are generally implemented using programmatic code that is written using the same programming languages that are used for implementing web pages. From a browser's perspective, extensions effectively function as web pages that are an integrated part of the browser once they are installed. By installing extensions that are of interest to him or her, a user can effectively create a custom browser that includes the functionality of the extensions they choose to install.

SUMMARY

According to one general aspect, a method of managing a web browser extension by an apparatus may include executing, by a processor included by the apparatus, a web browser. The method may also include loading, via the web browser, a web browser extension, wherein the web browser extension includes at least one web page configured to alter the functionality of the web browser. The method may further include dynamically re-loading or unloading, via the web browser, the web browser extension without restarting the web browser. In some embodiments, loading or unloading the web browser extension causes the functionality of the web browser to change.

According to another general aspect, an apparatus that includes a processor and a web browser. In various embodiments, the processor may be configured to execute a web browser. The web browser may be configured to: provide a set of functionality, load a web browser extension, and dynamically re-load or unload the web browser extension without restarting the web browser, wherein loading or unloading the web browser extension causes the functionality of the web browser to change. In some embodiments, the web browser extension may include at least one web page configured to alter the functionality of the web browser.

According to another general aspect, a computer-readable medium may be tangibly embodied and include executable code. In various embodiments, the executable code may cause an apparatus to: execute, by a processor included by the apparatus, a web browser; load, via the web browser, a web browser extension, wherein the web browser extension includes at least one web page configured to alter the functionality of the web browser; and dynamically re-load or unload, via the web browser, the web browser extension without restarting the web browser. In some embodiments, loading or unloading the web browser extension may cause the functionality of the web browser to change.

According to one general aspect, a method of managing a web browser extension by an apparatus may include executing, by a processor included by the apparatus, a web browser. The method may include installing on the apparatus, via the web browser, a web browser extension. In one embodiment, the web browser extension may include at least one web page configured to alter the functionality of the web browser, and a substantially unique identifier (UID) based upon a public encryption key. The method may further include launching, via the web browser, the web browser extension based upon the substantially unique identifier.

According to another general aspect, an apparatus may include a processor and a web browser. The processor may be configured to execute a web browser. The web browser may be configured to: install on the apparatus a web browser extension, and a substantially unique identifier (UID) based upon a public encryption key, and launch the web browser extension by employing the substantially unique identifier. In various embodiments, the web browser extension may include at least one web page configured to alter the functionality of the web browser.

According to another general aspect, a computer-readable medium may be tangibly embodied and include executable code. The executable code may be configured to cause an apparatus to: execute, by a processor included by the apparatus, a web browser; install on the apparatus, via the web browser, a web browser extension; and launch, via the web browser, the web browser extension based upon the substantially unique identifier. In some embodiments, the web browser extension may include at least one web page configured to alter the functionality of the web browser, and a substantially unique identifier (UID) based upon a public encryption key.

The details of one or more implementations are set forth in the accompanying drawings and the description below. Other features will be apparent from the description and drawings, and from the claims.

A system and/or method for managing the execution of an extension to a web browser, substantially as shown in and/or described in connection with at least one of the figures, as set forth more completely in the claims.

BRIEF DESCRIPTION OF THE DRAWINGS

FIG. 1 is a block diagram of an example embodiment of a system in accordance with the disclosed subject matter.

FIG. 2a is a block diagram of an example embodiment of a user interface in accordance with the disclosed subject matter.

FIG. 2b is a block diagram of an example embodiment of a user interface in accordance with the disclosed subject matter.

FIG. 3b is a block diagram of an example embodiment of a system in accordance with the disclosed subject matter.

FIG. 4 is a block diagram of an example embodiment of a system in accordance with the disclosed subject matter.

FIG. 6 is a block diagram of an example embodiment of a file in accordance with the disclosed subject matter.

FIG. 7 is a flow chart of an example embodiment of a technique in accordance with the disclosed subject matter.

FIG. 8 is a flow chart of an example embodiment of a technique in accordance with the disclosed subject matter.

Like reference symbols in the various drawings indicate like elements.

DETAILED DESCRIPTION

Figure 3A:
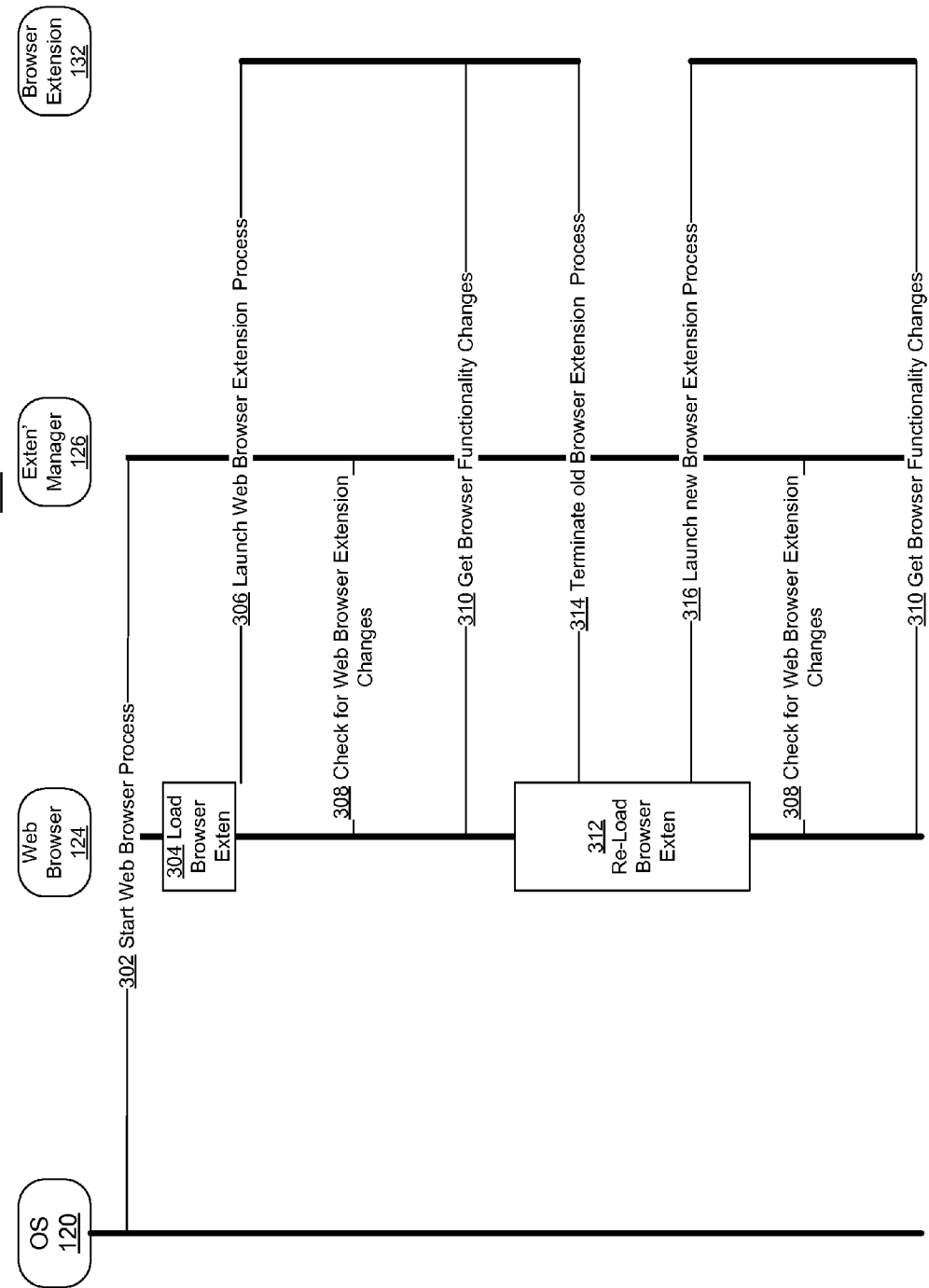
FIG. 3a is a block diagram of an example embodiment of a system in accordance with the disclosed subject matter.

FIG. 1 is a block diagram of an example embodiment of a system 100 in accordance with the disclosed subject matter. In one embodiment, the system 100 may include a computing device 102 which is used or operated by a user 190. In various embodiments, the computing device 102 may include a processor 110 configured to execute one or more machine executable instructions or pieces of software, firmware, or a combination thereof. The computing device 102 may include, in some embodiments, a memory 112 configured to store on or more pieces of data, either temporarily, permanently, semi-permanently, or a combination thereof. Further, the memory 112 may include volatile memory, non-volatile memory or a combination thereof. In some embodiments, the computing device 102 may include one or more network interfaces 114 configured to associate with and communicate via one or more communication networks (e.g., a wired network, a wireless network, a cellular network, etc.). In various embodiments, the computing device 102 may include a storage medium 116 configured to store data in a semi-permanent or substantially permanent form. In various embodiments, the storage medium 116 may be included by the memory 114. In various embodiments, the computing device 102 may include one or more other hardware components 118 (e.g., a display or monitor, a keyboard, a touchscreen, a camera, a fingerprint reader, a video processor, etc.).

In various embodiments, the computing device 102 may include an operating system (OS) 120 configured to provide one or more services to an application 112 and manage or act as an intermediary between the applications 122 and the various hardware components (e.g., the processor 110, the network interface 114, etc.) of the computing device. In such an embodiment, the computing device 102 may include one or more native applications 122, which may be installed locally (e.g., within the storage medium 116, etc.) and configured to be executed directly by the processor 110 and directly interact with the OS 120. In such an embodiment, the native applications 122 may include pre-compiled machine executable code. In some embodiments, the native applications 122 may include a script interpreter (e.g., C shell (csh), AppleScript, AutoHotKey, etc.) or a virtual machine (e.g., the Java Virtual Machine, the Microsoft Common Language Runtime, etc.) that are configured to translate source or object code into executable code which is then executed by the processor 110.

In some embodiments, the computing device 102 may include a web browser 124 configured to access a web site or a collection of web pages, scripts, etc. from a physically remote server or web server (e.g., servers 104, 106 or 108, etc.). In some embodiments, the web browser 124 may be included as one of the native applications 122 or as a portion of the operating system 120.

In various embodiments, the web browser 124 may include or be configured to interact with one or more browser extensions 132. In this context, a "browser extension 132" may include one or more web pages (e.g., web page 140, etc.) packaged or grouped together as a definable whole, and configured to add functionality to the web browser 124. In one embodiment, a browser extension 132 may add functionality by altering the way a web page 182 or web site 180 is displayed or rendered by the web browser 124 (e.g., by blocking advertisements, adding hyperlinks, etc.). In another embodiment, the browser extension 132 may add functionality by communicating with a server (e.g., server 108) and updating or altering the user interface (UI) of the web browser 124 (e.g., placing or changing an icon in the web browser's 124 toolbar, etc.). It is understood that the above are merely a few illustrative examples to which the disclosed subject matter is not limited.

In this context, a "web page" includes a file or document which is a portion of a web site. In various embodiments, such web pages may include a file formatted as Hypertext Markup Language (HTML), Cascading Style Sheets (CSS), JavaScript, Extensible Markup Language (XML) such as a XHTML (Extensible HyperText Markup Language) file, an Adobe Flash file, images, videos, etc. In various embodiments, the web browser 124 may process one or more web pages in order to render one web page. For example, an HTML web page may be modified or include other web pages, such as, JavaScripts, a CSS file, various images, etc. It is understood that the above is merely one illustrative example to which the disclosed subject matter is not limited.

In this context, a "web site" may include a collection or grouping of related web pages that are generally viewable or understandable (once rendered by the web browser 124) to the user 190. In various embodiments, when a web site (e.g., web site 180) is accessed via a communications network, the web site may be accessed via the Hypertext Transfer Protocol (HTTP) or Hypertext Transfer Protocol Secure (HTTPS). It is understood that the above is merely one illustrative example to which the disclosed subject matter is not limited.

In various embodiments, the web browser 124 may include or be associated with one or more web applications 134. In this context, a "web application" may include at least a portion of a web site which itself includes web pages. In this context, a "web application" may be configured to help a user 190, via the web site 138 of the web application 134, complete a single task or multiple tasks. In such an embodiment, the web application 134 may be configured to be executed or interpreted by the web browser 124. This is compared with the native applications 122 that include machine executable code and are configured to be executed directly by the processor 110 or via the operating system 120. Whereas, a web application 134 may be incapable of execution or display without the aid of the web browser 124.

In the illustrated embodiment, the web browser extension 132 may be packaged as an installable entity. In this context, "installation" includes the act of placing semi-permanently or substantially permanently one or more files (e.g., manifest 136, web pages 140, etc.) on the computing device 102 for later execution or processing.

In such an embodiment, the user 190, via the web browser 124, may contact a web browser extension store server 104 which includes or provides a web store 150. In various embodiments, the web store 150 may include one or more browser extensions 132x for download and installation. Each of these browser extensions 132x may be packaged as an installable entity in a predetermined format (e.g., Chrome Extension format (CRX), ZIP format, etc.).

In some embodiments, the web browser 124 may access a particular web store (e.g., web store 150 or web store 160, etc.) based upon a Universal Resource Identifier (URI) or Universal Resource Locator (URL) provided by a previously installed browser extension 132. In such an embodiment, a previously installed browser extension 132 may indicate the proper location or server from which to update or re-install the browser extension 132. It is understood that the above is merely one illustrative example to which the disclosed subject matter is not limited.

In various embodiments, the user 190 may select a browser extension (e.g., browser extension 132) to download and locally install on the computing device 102. In such an embodiment, the web browser 124 may download the browser extension 132 and either store it locally in the packaged format, or un-package or decompress the browser extension into a predetermined location (e.g., a browser extension portion of a file system in the storage medium 116, etc.).

In one embodiment, the browser extension 132 may include a metadata file or manifest 136 which includes information detailing or dictating how the web browser 124 should process or manage the browser extension and/or what the contents of the installable browser extension 132 are. A portion of a manifest 132 is described in more detail in reference to FIG. 6.

In various embodiments, the manifest file 136 may include a name and description of the browser extension 132. The manifest 136 may also include a description of the web pages and their respective types or purposes included by the browser extension 132. The manifest 136 may further include a description type of browser extension 132.

In one embodiment, the browser extension 132 may be classified into one or more of a particular type of browser extensions 132. In various embodiments, these types or categories may be divided based upon the alterations or type of functionality the browser extension 132 provides or changes in the web browser 124. In one embodiment, the types or categories of browser extensions 132 may include (but are not limited to): "browser_action" that alter the functionality of the browser 124 and alter the user interface (UI) (e.g., toolbar, etc.) of the web browser 124 itself regardless of the web page 182 displayed (e.g., place an icon in the browser 124's toolbar, etc.), "page_action" that alter the functionality of the browser 124 and/or alter the user interface (UI) of the web browser 124 depending on or based upon the web page 182 displayed (e.g., place an icon in the browser 124's address bar based on the URL in address bar, change the rendering of a downloaded web page, etc.), and "theme" that changes the look and feel of the browser 124 (e.g., makes the) but does not alter any functions of the browser 124. It is understood that the above are merely a few illustrative examples to which the disclosed subject matter is not limited.

In some embodiments, the web pages 140 included by the browser extension 132 may be typed or categorized not just by the format of the web page 140 (e.g., HTML, JavaScript, etc.) but also by the functionality provided by or method of processing the web browser 124 provides to the respective web page. In various embodiments, these types or categories of browser extension 132 web pages 140 may include (but are not limited to): "background_page" includes a web page that includes a long-running script to manage some task or state (often without being displayed to the user 190), "browser_url_overrides" include a web page(s) that substitute an HTML (or other) file from the browser extension 132 for a web page that web browser 124 normally provides (e.g., a bookmark manager, a new tab web page, etc.), "content_scripts" include a script (e.g., JavaScript, etc.) that are executed within the context of another web page (e.g., web page 182) and may read and/or alter the contents of the web page (e.g., an advertisement blocker, etc.), "homepage_url" includes a web page that is the home or main page of the browser extension such a web page may include information regarding the browser extension 132, and "options_Page" includes a web page that includes a means to adjust configurable options related to the browser extension 132. It is understood that the above are merely a few illustrative examples to which the disclosed subject matter is not limited.

Further, in various embodiments, the manifest 136 may include various fields or values indicating how the web browser 124 is to process or execute the browser extension 132. In some embodiments, these various fields may include (but are not limited to): "incognito/private_browsing" that indicates how the browser extension 132 is to act when the web browser operates in a non-normal or alternative operating mode, "key" a public key associated with the browser extension (described below in reference to keys 152 and 162), "minimum/maximum_browser_version" an indication of the version(s) of the web browser 124 this browser extension 132 is configured to be executed by, "launch" an indication of a keyword, URL, or URL portion which will cause the web browser 124 to launch or execute the browser extension 132, "permissions" an indication of what permissions (described in more detail below) that the browser extension 132 desires or requires, "plug-ins" an indication of what other extensions or pre-compiled machine executable applications 122 the browser extensions requires or desires to function, and "update_url" an indication of where or which URL to use when updating the browser extension 132. It is understood that the above are merely a few illustrative examples to which the disclosed subject matter is not limited.

In one embodiment, the web browser 124 may allow the browser extension 132 access to permissions or functionality not normally provided to a remote web site 180. In such an embodiment, the computing device 102 or the web browser 124 may include a permissions manager (not shown) configured to manage user 190 allowed permissions for various functionality features (e.g., access to the storage medium 116, access to a camera, access to a location sensor, the ability to issue pop-up notifications to the user 190, etc.) of the computing device 102. In such an embodiment, a browser extension 132 may indicate (e.g., via the manifest 136) that the browser extension 132 may require or would desire permission to utilize one or more features associated with the computing device 102. In various embodiments, these features may include accessing information provided by one or more components or system resources (e.g., a camera, storage space, network bandwidth, location, etc.) of the computing device 102. It is understood that the above is merely one illustrative example to which the disclosed subject matter is not limited.

In one embodiment, when the browser extension 132 is installed, the user 190 may be asked to grant or deny the browser extension 132 permission to access these one or more system resources. In various embodiments, if the user 190 does not grant access to the requested system resources, the installation of the browser extension 132 may fail. In another embodiment, the browser extension 132 may request access for required and/or desired permissions. In such an embodiment, the browser extension 132 installation may successfully complete even if some of the desired permissions where not granted.

In various embodiments, the web browser 124 or permission manager may maintain a list of the granted or denied permissions and their association with the respective web applications (for systems including more than one browser extension 132). In such an embodiment, the browser extension 132 or web browser 124 may not need to re-ask the user 190 for permissions every time the browser extension 132 is executed. In various embodiments, each time the browser extension 132 is executed or accessed the permissions manager or web browser 124 may grant or deny access to the system resources based upon the user 190's previous indications. In some embodiments, as the browser extension 132 is re-installed or updated the grant or denial of permissions may be re-asked and re-granted or denied. In yet another embodiment, the permissions manager 126 may include a means by which the user 190 may change or alter the set permissions as the user 190 wishes without needing to reinstall the browser extension 132.

FIGS. 2A and 2B illustrate two embodiments of a browser extension 132 and may be useful in understanding two possible ways in which a browser extension 132 may alter the functionality of the web browser 124. Further it is understood that the browser extension 132 may alter the functionality of a web browser 124 in ways that are less visible than the illustrative examples shown in FIGS. 2A and 2B. For example, a browser extension 132 that makes use of a background web page (e.g., a browser extension that blocks web browser cookies or enhanced privacy settings, etc.) may not be visible or be displayed to a user. It is understood that the above are merely a few illustrative examples to which the disclosed subject matter is not limited.

FIG. 2a is a block diagram of an example embodiment of a user interface (UI) 200 in accordance with the disclosed subject matter. The UI 200 may include a web browser 203 and its displayed window. The web browser 203 may have loaded web pages in a series of tabs 202, 204, 206, and 208. The web browser 203 may be currently displaying the web page rendered in tab 202 (illustrated by the highlighted tab or tab handle 202).

However, in one embodiment, the web page rendered in tab 202 may include a web page element that plays an audio signal (e.g., a music player, a movie web site, etc.). In a traditional, non-extended, "vanilla" web browser 203 a user may not have any indication of which tab is associated with the audio nor a means to easily control the audio signal playing in a tab. However, in the illustrated embodiment, the browser extension 210 (illustrated by the dotted circle) may be installed. In the illustrated embodiment, the browser extension 210 may alter the functionality of the web browser 203 such that the tab associated with the audio may both be easily identified and controlled.

In one embodiment, the browser extension 210 may cause the web browser 203 to display an icon or other UI element 212 on the toolbar associated with the tab 202 which is itself associated with the audio signal. In addition, the browser extension 210 may cause the web browser 203 to respond or react to UI events (e.g., right-mouse click, key presses, etc.) that are associated with the added icon 212. In the illustrated embodiment, once the web browser 203 or the browser extension 210 detects an appropriate UI event (e.g., right-mouse click, etc.), the browser extension 210 may cause a menu or other UI element 214 to be displayed. In various embodiments, the menu 214 may actually be a HTML popup that may be created and controlled via JavaScript code that is included by the browser extension 210. It is understood that the above is merely one illustrative example to which the disclosed subject matter is not limited.

From this menu 214 and its associated menu items, the browser extension 210 may cause the web browser 203 to control (e.g., pause, mute, adjust the volume, etc.) of the audio signal or manage the web page element (e.g., the music player, the HTML version 5 (HTML5) audio tag, etc.) causes in the audio signal to be played. It is understood that the above is merely one illustrative example to which the disclosed subject matter is not limited.

In various embodiments, the icon 212 and the scripts providing the functionality for the menu 214 may be included as web pages of the browser extension 210. In some embodiments, the icon 212 may include a web page that is an image (e.g., a bitmap, a JPEG fie, etc.). In various embodiments, the script or scripts providing the functionality of the menu 214 may include JavaScripts. It is understood that the above are merely a few illustrative examples to which the disclosed subject matter is not limited.

FIG. 2b is a block diagram of an example embodiment of a user interface (UI) 201 in accordance with the disclosed subject matter. The UI 201 may include a web browser 205 and its displayed window. The web browser 205 may have loaded web pages in a series of tabs 202, 204, 206, and 208. The web browser 205 may be currently displaying the web page 240 rendered in tab 204 (illustrated by the highlighted tab or tab handle 202).

In one embodiment, a normal, un-extended, or "vanilla" version of the web browser 205 may simply display the web pages (and their associated web page elements, e.g., images, etc.) retrieved from a web site, such as, web page 240 rendered in tab 206. However, in the illustrated embodiment, the web browser 205 has been extended with browser extension 250 (illustrated by the circle around its resultant web page 256). In such an embodiment, the browser extension 250 may be configured to add a collapsible web pane or panel 256 media player to any web page normally rendered by the web browser (e.g., web page 240). In such an embodiment, the browser extension 250 may alter the functionality of the web browser not by altering the web browser 205 UI, but by altering the way the web browser 205 renders various web pages. It is understood that the above are merely a few illustrative examples to which the disclosed subject matter is not limited.

In the illustrated embodiment, the browser extension 250 may include a web page that results in a collapsible web pane or web UI element 256 that may be currently collapsed into a small UI element that hovers "above" or "in front of" the web page 240 rendered by the web browser 205. In such an embodiment, the web pane 256 may be expanded into a separate tab (e.g., tab 208, etc.) or as a larger web UI element (not shown) that hovers "above" or in front of the web page 240 rendered by the web browser 205. In such an embodiment, the browser extension 250 may include a web page element 254 that, upon receiving a UI event (e.g., mouse click, etc.) causes the web pane 256 to expand or collapse.

In the illustrated embodiment, the web pane 256 may allow a user to play various audio files or signals (e.g., stored locally or streamed remotely, etc.). In such an embodiment, the browser extension 250 may provide additional web page elements or UI elements (not shown) that, when in an expanded state or mode, allow the user to manipulate the audio signal (e.g., pause, mute, go to next item on playlist, etc.). In one embodiment, the browser extension 250 may include a web page element 252 configured to indicate to a user that an audio signal is being played. In various embodiments, the web page element 252 may change to indicate other operational states (e.g., muted vs. unmuted, volume levels, etc.).

In various embodiments, the icons and the scripts providing the functionality for the UI elements 252, 254, and 256 may be included as web pages of the browser extension 250. In some embodiments, the icons associated with the UI elements 252 and 254 may include a web page that is an image (e.g., a bitmap, a JPEG fie, etc.). In one embodiment, the structure of the web pane 256 may be included as one or more HTML files. In various embodiments, the script or scripts providing the functionality of the pane 256 and UI elements 22 and 254 may include JavaScripts. It is understood that the above are merely a few illustrative examples to which the disclosed subject matter is not limited.

Returning to FIG. 1, in one embodiment, the computing device 102 may execute the web browser 124 via at least one execution process 172. In this context, an "execution process" or more commonly simply called "process" includes a stream of machine executable instructions that make up a definable computer program. In various embodiments, a larger program (e.g., a web browser 124) may include a plurality of processes (e.g., the process for the retrieving and rendering for each tab where multiple tabs exist, a process for the main window of the web browser, process for the management of browser extensions, etc.). In various embodiments, an execution process may be terminated or started without affecting, due to the termination, etc., the execution of another execution process. However, it is understand that two or more execution processes may communicate information. Therefore, if a first execution process (e.g., execution process 172) terminates, it may not be able provide information to a second execution process (e.g., execution 174) causing that second process to crash or error. However, the converse is not necessarily true, depending upon how the software programs are designed to communicate and handle communication.

In the illustrated embodiment, the processor 110 may execute at least one execution process 172 for the web browser 124. In various embodiments, this web browser (WB) process 172 may be initiated or started by the operating system 120. In various embodiments, each browser extension 132 may be configured to be executed within at least one execution process 174. The starting and stopping of these web browser extension (WBE) processes 174 may be controlled by the web browser 124 or an extension manager 126. In various embodiments, the extension manager 126 may include an execution process that is included within the web browser 124 or one of the web browser processes 172.

In such an embodiment, as the web browser 124 (or more accurately its execution process 172) may communicate with the browser extension execution processes 174. In an example of such an embodiment, the web browser process 172 may transmit a web page to the browser extension process 174 for editing and alteration (e.g., the browser extension of FIG. 2B, etc.) and the browser extension process 174 may transmit the altered web page back to the web browser process 172 for rendering and display to the user 190. In another embodiment, the web browser process 172 may query the browser extension process 174 for any UI changes (e.g., additional icons on the web browser 124's toolbar, etc.). Other forms of communication between the processes 172 and 174 may be envisioned. It is understood that the above are merely a few illustrative examples to which the disclosed subject matter is not limited.

In light of the above understanding of the general structure of various embodiments the web browser 124 and the browser extension 136, a more detailed description of various embodiments of the process of installing, upgrading, loading, and unloading or uninstalling a browser extension 132 may now be described.

In one embodiment, as described above, the user 190 may wish to install a browser extension 132. For purposes of this description, it is assumed that the browser extension 132 has not been previously installed on the computing device 102. The process of upgrading a browser extension 132 is described later.

In one embodiment, a browser extension 132 may be obtained from one of two general types or categories of web stores. The first category is a collective or heterogeneous web store 150 that is hosted by a collective or heterogeneous web browser extension store server 104. In such an embodiment, the web store 150 may be referred to as "collective" or "heterogeneous" because it provides browser extensions 132$x$ (and possibly web applications, not shown) from a plurality of developers or sources. This type of heterogeneous web store 150 may be as analogous to a traditional retail store whose shelves stock products (e.g., shoes, groceries, etc.) from a plurality of different producers (e.g., Nike, Reebok, Adidas, New Balance, etc.).

Conversely, in various embodiments, a self-hosted web store 160 hosted on a self-hosted WBE store server 106 may include browser extensions 132$y$ from a single or a small number of developers. This type of self-hosted web store 160 may be analogous to a "mom & pop" store that only sells products from a single producer or a relatively small group of producers. For example, a restaurant, a booth at a farmer's market, an artist's art gallery, etc. may be thought as being analogous to the self-hosted web store 160. And, in such an embodiment, it is likely that the same entity or person that runs the self-hosted web store 160 is the same entity or closely related to the entity that developed the browser extensions 132$y$ (or web applications, not shown). However, in various embodiments, the self-hosted web store 160 may be hosted not by a small entity (e.g., a mom & pop store), but instead by a larger entity that simply desires the increased control that comes with self-hosting their own web store 160. For example, a large entity like Facebook, Dell, etc. may provide a self-hosted web store 160. It is understood that the above are merely a few illustrative examples to which the disclosed subject matter is not limited.

In one embodiment, the user 190 may elect to download their desired browser extension 132$y$ from the self-hosted web store 160. This browser extension 132$y$ may eventually be installed as browser extension 132. In such an embodiment, the browser extension 132$y$ may be associated with a public encryption key and a private encryption key, also referred to as a public/private encryption key pair 162. In one embodiment, these keys 162 may be hosted on the self-hosted WBE server 106.

As is understood in the realm of public key cryptography, a public/private encryption key pair 162 may be used for a number of purposes. In addition to encryption, the key pair 162 may be used for authentication purposes or "signing" a document or file, such as the browser extension 132y. In such an embodiment, a downloader or second party (wherein the singer is the first party) may verify (1) that the signer was actually the first party and not some forger, and (2) that nothing in the document or file has been changed since the signature or encryption has occurred. Therefore, a receiving party (e.g., the user 190 or the web browser 124, etc.) may verify that the document is genuine and uncorrupted.

In such an embodiment, the private key of the private/public key pair 162 may be kept secret (in the illustrated embodiment, known only to the developer of the browser extension 132y). Conversely, the public key of the public/private key par 162 may be openly known. In such an embodiment, to sign a file (e.g., browser extension 132y) the web store 160 may encrypt the file with the public key. To authenticate the encrypted file, the receiver (e.g., web browser 124) may decrypt the file using the public key of the public/private key pair 162. Public key encryption is such that only the public key matching the encrypting private key will properly decrypt the file, a third un-associated public key will not work. Therefore, receiver may be assured of the validity of the downloaded file.

In such an embodiment, the web store 160 may sign or encrypt the browser extension 132y with the private key portion of the public/private key pair 162. In a preferred embodiment, the entire browser extension 132y may be encrypted. In another embodiment, only a portion (e.g., a signature field, authentication value 166, etc.) of the browser extension 132y may be encrypted. Further, in one embodiment, the public key portion of the public/private key pair 162 may be included with (e.g., as part of the manifest) the browser extension 132y.

In such an embodiment, upon receipt of the browser extension 132y, the web browser 124 or the extension manager 126 may be configured to verify or authenticate the browser extension 132y via the public encryption key. As described above, in one embodiment, the public key may be provided with the browser extension 132y or retrieved separately from the WBE Store server 106. In various embodiments, if the verification or authentication of the browser extension 132y fails, the web browser 124 may be configured to not install the browser extension 132y. If the browser extension 132y has been properly authenticated or signed, the installation may continue.

In one embodiment, the web browser 124 may review or read the manifest 136 for one or more of the various fields as described above. In various embodiments, the web browser 124 may determine a substantially unique identifier (UID) 138 associated with the browser extension 132y (now browser extension 132). This UID 138 may be used in a variety of ways when processing the browser extension 132.

In one embodiment, the browser extension's UID 138 may be employed to store or place the installed web pages 140 of the browser extension 132 into the storage medium. For example, the UID 138 may be included in a directory name that comprises the root-level of the web pages 140 and files installed by the browser extension 132. In another embodiment, the browser extension's UID 138 may be employed for inter-process communication. For example, messages transmitted between the WBE's process 174 and the WB process 172 and/or other WBEs' processes may include the browser extension's UID 138 as a target or source header field to identify which process is the receiver or transmitted of the inter-process communication message.

In yet another embodiment, the UID 138 may be employed as a way for the web browser 124 to access web pages 140 of the browser extension 132. For example, the UID 138 may be included in a URL or other means to access one of the web pages 140 (e.g., an options page, a help page, a script, etc.). For example the URL may by the URL "chrome-extension://12345/main.html" where the "chrome-extension://" protocol portion may indicate that the web page accessed is part of a browser extension. The "12345" may be the UID portion of the URL, where "12345" is the extension's UID 138 and indicates which amongst a plurality of browser extensions is being accessed. And, the "main.html" may be the web page portion of the URL indicating which web page 140 of the browser extension having the UID "12345" is being accessed. In one embodiment, the UID 138 may be included in a substantially permanent or semi-permanent URL from which the browser extension, in a packaged installable form, may be downloaded form a web store. It is understood that the above are merely a few illustrative examples to which the disclosed subject matter is not limited.

As described above, in one embodiment, a web browser extension (e.g., browser extensions 132x, 132y, or 132, etc.) may be assigned a substantially globally unique identifier (UID or GUID). In various embodiments, the browser extension may be assigned or associated with a public/private encryption key pair. In one illustrative embodiment, the public/private encryption key pair (e.g., key pairs 152 or 162, etc.) may include two 1024 bit encryption keys. In such an embodiment, the private encryption key may be kept secret to only one or a few enitities. For example, in various embodiments, the private encryption key may be only known to both the browser extension developer and the proprietor of the web browser extension store, as described above. Conversely, the public encryption key may be widely or publicly known.

In such an embodiment, one of the encryption keys (e.g., the public encryption key) may be used to produce a hash value that is substantially globally unique. In this context, a "cryptographic hash function" may include a deterministic procedure that takes an arbitrary block of data (e.g., the public encryption key, etc.) and returns a fixed-size bit string, the hash value, such that an accidental or intentional change to the data will change the hash value. In a preferred embodiment, the cryptographic hash function used to produce the hash value may include the Secure Hash Algorithm-Two-Fifty-Six (SHA-256) hash function developed by the United States' National Security Agency (NSA). In such an embodiment, the public/private encryption key pair may include a Rivest, Shamir and Adleman (RSA) public/private encryption key pair. It is understood that the above is merely one illustrative example to which the disclosed subject matter is not limited.

In one such embodiment, by generating the hash value from the public key, it may be possible for anyone who knows the public encryption key to generate the hash value. Therefore, the hash value may be widely known or derivable. Further, depending upon the hash function, the hash value may be sufficiently or substantially unique in that no two pieces of starting data (i.e., public keys, etc.) are statistically likely to produce the same resultant hash values. In such an embodiment, the hash value may be thought of as substantially globally unique.

In one embodiment, this hash value may be fairly large. While this may not be undesirable for authentication and signature purposes, as described above, the hash value may be too large to be desirable for identification purposes. However, as computing resources (e.g., memory, processing power, bandwidth, etc.) increase it is understood the desirable length of an identifier (ID) may also increase.

In such an embodiment, the GUID may be derived from the larger hash value. In one embodiment, the GUID may include just the first 128-bits or 32 characters, hex-encoded of the resultant hash value. It is understood that the above is merely one illustrative example to which the disclosed subject matter is not limited.

In some embodiments, this may result in a hex-encoded GUID. In various embodiments, it may be desirable to encode the GUID using another encoding scheme. In one specific illustrative embodiment, hex-encoding may be used for a variety of purposes on the computing device or within the context of the web browser. For example, Internet Protocol version 6 (IPv6) network addresses are generally 128-bit addresses encoded as 32 hex characters. Therefore, it is conceivable that in some embodiments, a web browser may confuse a 32 hex-character IPv6 address with a 32 hex-character browser extension GUID. This may be more likely in embodiments in which the GUID is employed in a Universal Resource Locator (URL), as described above. In such an embodiment, the GUID may be re-encoded via a scheme that would not be confused with an IPv6 network address. However, it is understood that the motivations for selecting an encoding scheme for the GUID is not limited to this illustrative example.

In various embodiments, the GUID may be encoding using a scheme that does not include or employ numeric (i.e., the numbers 0-9) values. In one embodiment, this may include converting the hex characters 0-F to the alphabetic characters A-P. In such an embodiment, a simple 1-to-1 mapping may be used in which the hex character 0 becomes the alphabetic character A; the hex character 1 becomes the alphabetic character B; the hex character 3 becomes the alphabetic character C; and so forth. In such an embodiment, the hex-encoded value "01:01:23:51:CD:71:A6:14:8B:AF:D7:65:02:31:BA:35" may become the alphabetic encoded value "ab:ab:cd:fb:mn:hb:kg:be:il:kp:nh:gf:ac:db:lk:df". In various embodiments, this encoding scheme may be referred to as "mpdecimal", although mpdecimal may not include the colons (:) separating the encoded bits into octets. It is understood that the above is merely one illustrative example to which the disclosed subject matter is not limited.

As described above, in various embodiments, the browser extension's 132's UID 138 may be based upon the browser extension's corresponding public/private encryption key stored on the web store (e.g., web store 160, etc.).

In various embodiments, once the browser extension 132 has been installed, the browser extension 132 may be loaded or launched via the web browser 124 or the extension manager 126. In some embodiments, the extension manager 126 may be included as part of the web browser 124, as described above. In such an embodiment, the extension manager 126 may start the execution of a process 174 associated with the browser extension 132.

In one embodiment, the extension manager 126 may launch or load the browser extension 132 using or based upon the extension's UID 138. In such an embodiment, the extension manager 126 or web browser 124 may access a launching web page (e.g., web page 140) indicated in the extension's manifest 136. Accessing this launching web page may include using a URL or a file system path that includes the extension's UID 138, as described above. It is understood that the above is merely one illustrative example to which the disclosed subject matter is not limited.

In one embodiment, the web browser 124 (or a processes 172 associated with the web browser 124) may periodically ask the extension manager 126 if any new browser extensions have been started since the last check. In another embodiment, the extension manager 126 may notify the web browser 124 (or process 172) of the launch of a new WBE process 174. In yet another embodiment, the WBE process 174 (or browser extension 132) may notify the WB process 172 (or web browser 124) that the WBE process 174 has been launched. It is understood that the above are merely a few illustrative examples to which the disclosed subject matter is not limited.

Once the web browser 124 is aware that a browser extension 132 has launched, the web browser 124 may communicate with the browser extension 132 and determine what web browser functionality is being altered by the browser extension 132. In various embodiments, this may include the alteration of the web browser 124's UI, the execution of a background web page, alteration or overlaying of other web pages 182, etc., as described above. It is understood that the above are merely a few illustrative examples to which the disclosed subject matter is not limited. In various embodiments, the web browser 124 may alter its functionality based upon the browser extension 132, as described above.

In such an embodiment, with the web browser 124 executing in a first or at least a first process 172, and each browser extension 132 executing in a second or at least a second process 174, individual browser extensions 132 may be launched or loaded or even terminated or unloaded without the need to restart the web browser 124 and its process 172. Further, in some embodiments, the use of inter-process communication between the processes 172 and 174 may allow changes in one process (e.g., the starting of a process, the stopping of a process, a change in the settings governing a process, etc.) may affect another process without requiring that the affected process (e.g., process 172) be restarted. This is contrasted with web browsers that execute the web browser and their extensions in a single process that must be restarted in order to adapt to the loading or unloading of a browser extension.

Continuing, in one embodiment, the browser extension 132 may be uninstalled, unloaded, or disabled. In various embodiments, this may be done because a user 190 explicitly requests that a browser extension 132 be uninstalled or disabled. In another embodiment, this may occur as part of the process of upgrading a browser extension, as described below. In yet another embodiment, this may occur due to an external event, such as receiving a blacklisting message, as described below. However, other reasons for uninstalling, unloading or disabling a browser extension 132 may occur. It is understood that the above are merely a few illustrative examples to which the disclosed subject matter is not limited.

In various embodiments, uninstalling may include deleting any data or files (e.g., web page 140, saved user data, etc.) from the computing device 102. Conversely, disabling may leave the data or files on the computing device 102 but prevent the browser extension from loading or starting a WEB process 174.

As mentioned above, in some embodiments, the computing device 102 may receive a blacklisting message from a web store (e.g., web store 150 or 160) or another server (not shown). In various embodiments, the blacklisting message may indicate that one or more versions (e.g., all versions, versions 2.0-2.5, etc.) of a browser extension 132 are to be disabled. In some embodiments, the blacklisting message may indicate that the browser extension 132 should be uninstalled. For example, the browser extension 132 may have been determined to be malicious or violate a term of service, etc. In such an embodiment, the blacklisting message may identify or indicate the browser extension 132 to be either disabled or uninstalled based upon the browser extension's UID 138. However, a browser extension 132 may be uninstalled, unloaded or disabled for other reasons, as described above. It is understood that the above is merely one illustrative example to which the disclosed subject matter is not limited.

In an embodiment in which a browser extension 132 is to be uninstalled, unloaded, or disabled, the web browser 124 or the extension manager 126 may indicate to a browser extension's process 174 that it is to terminate or end execution. As described above, in various embodiments, this inter-process communication may occur by employing the UID of the to-be-un-loaded browser extension. In another embodiment, the browser extension's process 174 may be terminated via the operating system 120 or other means. As described above, due to the separated or individual process nature of the web browser 124 and its associated browser extensions 132 the termination of the browser extension process 174 may not restart or adversely affect the web browser process 172.

In one embodiment, the web browser 124 may become aware that the browser extension 132 has been unloaded or stopped. As described above, this may occur due to periodic checking by the web browser 124, a message from the extensions manager 126, a message from the terminating browser extension 132, etc. Upon becoming aware that the browser extension 132 has terminated the web browser 124 may restore or alter its functionality to the same state as if the browser extension 132 had not been loaded or executed. As described above, in various embodiments, this may include dynamically altering the web browser's UI, re-rendering a web page (e.g., web page 182), or other alterations to the web browser's functionality. In various embodiments, any altered web pages (e.g., web page 182) may not be re-rendered until the web page is explicitly re-loaded (e.g., via a user 190 selecting a refresh button, etc.).

In various embodiments, this may also occur if the browser extension's process 174 terminates unexpectedly or abnormally (e.g., via a crash, etc.), and not just if the browser extension's process 174 terminates due to a desired uninstallation, unloading, or disabling of the browser extension 132. In such an embodiment, the web browser 124 or extensions manager 126 may automatically attempt to restart or reload the browser extension 132, as described above. In another embodiment, the browser extension 132 may be disabled, until manually re-enabled by a user 190. In various embodiments, other error handling techniques may be employed. It is understood that the above are merely a few illustrative examples to which the disclosed subject matter is not limited.

In various embodiments, in which the browser extension 132 is uninstalled, as opposed to merely disabled or unloaded, the extension manager 126 or web browser 124 may delete or remove any files (e.g., web page 140, manifest 136, etc.) stored within the computing device 102 or storage medium 116. In various embodiments, the extension manager 126 or web browser 124 may transmit a message to the web store (e.g., web store 160) indicating that the browser extension 132 has been uninstalled.

In a third example, in one embodiment, the browser extension 132 may be updated or upgraded. In the illustrated embodiment, the browser extension's developer may have decided to move the browser extension from the self-hosted web store 160 to the collective or heterogeneous web store 150. In such an embodiment, the public/private key pair 162 may be moved from the self-hosted web store 160 to the public/private key pair 152 on the collective or heterogamous web store 150 provided by WBE store server 104. Likewise, the browser extension 132y may be moved to browser extension 132x. In such an embodiment, because the public encryption key associated with the browser extension remains the same (despite being moved) the UID associated with browser extension may remain the same.

In some embodiments, moving the browser extension 132 from a first web store (e.g., web store 160) to a second web store (e.g., web store 150) may include providing a first updated browser extension 132y with an updated version value 166 and a proper authentication value 166 that includes a manifest that indicates that the new update or upgrade URL or web store is the second web store 150. Any subsequent updates may be retrieved from the second web store 150, which was pointed to from the prior version of the browser extension. It is understood that the above is merely one illustrative example to which the disclosed subject matter is not limited.

In such an embodiment, the web browser 124 or extension manager 126 may periodically check any web stores pointed to or indicated by the installed browser extensions, for example, via their respective manifests. In the illustrated embodiment, the browser extension 132 may indicate that the web store 150 is the source of updated versions of the browser extension 132. If the browser extension with same UID as the installed browser extension is found on a web store, the web browser 124 or extension manager 126 may then check a version field or value (e.g., version values 156 or 166, etc.) to see if the browser extension (e.g., browser extension 132x or 132y) is newer or an update of the installed browser extension (e.g., browser extension 132).

If a new or updated browser extension (e.g., browser extension 132x) is found, the web browser 124 or extension manager 126 may automatically download and update or upgrade the new browser extension. In such an embodiment, the web browser 124 or extension manager 126 may install the new browser extension substantially as described above.

However, the following differences may occur. In one embodiment, the web browser 124 or extension manager 126 may, prior to loading or launching the new browser extension, terminate or unload the previous version of the browser extension 132, as described above. In another embodiment, this may occur prior to saving any updated files (e.g., manifest 136, web page 140, etc.) to the computing device 102 or storage medium 116. In one embodiment, saving the files of the updated browser extension 132 may include only saving files that have changed from the previous version or patching portions of files that have changed since the previous version. It is understood that the above are merely a few illustrative examples to which the disclosed subject matter is not limited.

In one embodiment, prior to updating or overwriting a previously installed browser extension 132, the web browser 124 or extension manager 126 may check that the version number or value associated with the updated browser extension (e.g., version value 156 of browser extension 132x) is higher or indicates a newer version than the version number or value associated with the previously installed browser extension (e.g., version value 166 of browser extension 132y). In one embodiment, in which the version values are numeric this check may simply involve determining that the updated version of the browser extension is higher. In such an embodiment, this check may assure that a browser extension may only be updated to a newer version, and that it may not be rolled-back to a prior or older version of the browser extension.

FIG. 3a is a block diagram of an example embodiment of a system 300 in accordance with the disclosed subject matter. In one embodiment, the system 300 may include an operating system (OS) 120, a web browser 124, an extension manager 126, and at least one browser extension 132. In the illustrated embodiment, the black lines associated with each of the components of the system (e.g., OS 120, browser extension 132, etc.) represent the execution, by a processor, of an execution process associated with that component. In the illustrated embodiment, FIG. 3*a* shows the loading/launching and re-loading/re-launching of a browser extension 132.

Action 302 illustrates that, in one embodiment, the web browser 124 and any associated processes or sub-processes (e.g., extension manager 126) may be started. Actions 304 and 306 illustrate that, in one embodiment, as part of the initialization procedure of the web browser 124, the browser extension 134 may be launched or loaded. Action 306 illustrates that, in one embodiment, the execution process of the browser extension 132 may be started or begin execution by the processor.

Action 308 illustrates that, in one embodiment, the web browser 124 may check or be notified as to whether or not there have been any changes in the status of any browser extensions (e.g., browser extension 132), as described above. In various embodiments, such changes may include, the termination of a browser extension's process (Action 314), the start of a browser extension's process (Actions 306 or 316), the loading or unloading of a browser extension 132 (Actions 304 or 312), etc.

Action 310 illustrates that, in one embodiment, the web browser 124 may retrieve or be notified of any functionality changes created by the browser extension 132, as described above. Action 310 also illustrates that the web browser 124 may alter or change its functionality based on the loaded browser extension 132, as described above.

Action 312 indicates that the browser extension 132 may be re-loaded or re-launched. For example, a user may manually re-load a browser extension 132 or the browser extension's process may crash or terminate abnormally or unexpectedly. It is understood that the above are merely a few illustrative examples to which the disclosed subject matter is not limited.

In various embodiments, the web browser 124 may be configured to only install, launch or load a browser extension 132 if the browser extension 132 is either packaged as an installable entity, for example as downloaded from a web store or in a predefined packaging format (e.g., CRX, ZIP, etc.), or previously installed, for example in a local storage medium. This form of operation may be referred to as a "user mode" and may, in one embodiment, be the web browser 124's primary mode of operation.

Conversely, in various embodiments, the web browser 124 may be configured to operate in a second mode, for example a "developer mode". In such an embodiment, when operating in developer mode, the web browser 124 may be configured to launch or load a browser extension 132 even if the browser extension 132 is not packaged as an installable entity, or in some embodiments, even if the browser extension 132 is not signed or authenticated. In such an embodiment, a developer may be able to work or frequently alter or edit a browser extension 132 (or its web pages) and test it, without having to package, sign, and/or otherwise prepare their draft versions of the their browser extension 132. However, other uses or motivations for employing developer mode may occur and it is understood that the above is merely one illustrative example to which the disclosed subject matter is not limited.

In some embodiments, while in developer mode, the developer may be able to make changes to the browser extension 132 "in place" without having to reload the browser extension 132. In such an embodiment, the web browser 124 or browser extension 132 may be configured to dynamically re-read the extension's constituent or included web page whenever the web page is needed. For example, each time the web browser 124 displays a browser action popup belonging to the extension, the web page detailing that browser action popup may be read from the disk or storage medium. In such an embodiment, in developer mode, a developer may be able to simply edit the popup's file, display the popup in the web browser, hide the popup in the web browser, and the re-edit the popup's file and repeat as desired. In various embodiments, while operating in the normal, non-developer user mode, the web browser may not be configured to, in various embodiments, either dynamically re-read the extension's web pages or, in some embodiments, gain access to those web pages as they are either packaged or stored in the file system in a way that the user may not have access to them. It is understood that the above is merely one illustrative example to which the disclosed subject matter is not limited.

Action 314 illustrates that, in one embodiment, the previous or prior browser extension 132's execution process may be terminated, as described above. Action 312 further illustrates that, in one embodiment, the new version of the browser extension 132 may be checked, authenticated or installed, as described above. In some embodiments, the same version of the browser extension 132 may simply be re-started (e.g., after a crash, an unexpected termination of the prior browser extension process, etc.).

Action 316 illustrates that, in one embodiment, a new execution process associated with the browser extension 132 may be started, as described above. In various embodiments, if the browser extension has been updated or changed the new execution process may be associated with the new version of the browser extension 132.

Actions 308 illustrates that, in one embodiment, that, as described above, the web browser 124 may check or be notified of any changes to the browser extensions, as described above. Action 310 illustrates that, in one embodiment, the web browser 124 may alter or change its functionality based upon the changes indicated in Action 308, as described above.

FIG. 3*b* is a block diagram of an example embodiment of a system 301 in accordance with the disclosed subject matter. In one embodiment, the system 301 may include an operating system (OS) 120, a web browser 124, an extension manager 126, and at least one browser extension 132. In the illustrated embodiment, the black lines associated with each of the components of the system (e.g., OS 120, browser extension 132, etc.) represent the execution, by a processor, of an execution process associated with that component. In the illustrated embodiment, FIG. 3*b* shows the un-loading, stopping, or terminating of a browser extension 132.

Action 302 illustrates that, in one embodiment, the web browser 124 and any associated processes or sub-processes (e.g., extension manager 126) may be started. Actions 304 and 306 illustrate that, in one embodiment, as part of the initialization procedure of the web browser 124, the browser extension 134 may be launched or loaded. Action 306 illustrates that, in one embodiment, the execution process of the browser extension 132 may be started or begin execution by the processor.

Action 308 illustrates that, in one embodiment, the web browser 124 may check or be notified as to whether or not there have been any changes in the status of any browser extensions (e.g., browser extension 132), as described above. In various embodiments, such changes may include, the termination of a browser extension's process (Action 314), the start of a browser extension's process (Actions 306 or 316), the loading or unloading of a browser extension 132 (Actions 304 or 312), etc.

Action 310 illustrates that, in one embodiment, the web browser 124 may retrieve or be notified of any functionality changes created by the browser extension 132, as described above. Action 310 also illustrates that the web browser 124 may alter or change its functionality based on the loaded browser extension 132, as described above.

Action 350 illustrates that, in one embodiment, the browser extension 132 may be un-loaded or terminated. In various embodiments, this un-loading or termination may occur as part of the un-installation or removal of the browser extension 132. It is understood that the above is merely one illustrative example to which the disclosed subject matter is not limited.

Action 314 illustrates that, in one embodiment, the previous or prior browser extension 132's execution process may be terminated, as described above. Action 312 further illustrates that, in one embodiment, the new version of the browser extension 132 may be checked, authenticated or installed, as described above. In some embodiments, the same version of the browser extension 132 may simply be re-started (e.g., after a crash, an unexpected termination of the prior browser extension process, etc.).

Actions 308 illustrates that, in one embodiment, that, as described above, the web browser 124 may check or be notified of any changes to the browser extensions, as described above. Action 310 illustrates that, in one embodiment, the web browser 124 may alter of change its functionality based upon the changes indicated in Action 308, as described above.

FIG. 4 is a block diagram of an example embodiment of a system 400 in accordance with the disclosed subject matter. In one embodiment, the system 400 may include web browser extension store 150, a web browser 124, an extension manager 126, and at least one browser extension 132. In the illustrated embodiment, the black lines associated with each of the components of the system (e.g., web browser 124, browser extension 132, etc.) represent the execution, by a processor or a server, of an execution process associated with that component. In the illustrated embodiment, FIG. 4 shows a more detailed (in some respects) example of installing or upgrading a browser extension 132.

Action 402 illustrates that, in one embodiment, a browser extension 132 may be downloaded from the web store 150 in an installable package or entity, as described above. In one embodiment, this installable package may include a version value. In some embodiments, the installable package may be signed or authenticated using a public cryptographic key from a public/private cryptographic key pair, as described above.

Action 404 illustrates that, in one embodiment, the web browser 124 or, in another embodiment, the extension manager 126 may verify the authenticity of the downloaded installable package, as described above. In various embodiments, if the verification check fails (e.g., the signature does not match, etc.) the installation browser extension 132 may fail or be aborted, as described above.

Action 406 illustrates that, in one embodiment, the web browser 124 or, in another embodiment, the extension manager 126 may verify that the version of the recently downloaded browser extension 132 (in Action 402) is newer than any previously installed version of the browser extension 132. In some embodiments, this may include identifying any previously installed versions of the browser extension 132 based upon the UID of the browser extension 132. In one embodiment, the validity of the UID may be checked against the public key associated with the browser extension 132.

Action 408 illustrates that, in one embodiment, a browser extension 132 that has been authenticated or verified (Action 404) and, in some embodiments, a newer version of a previously installed version of the browser extension 132 (Action 406) may then be installed on the computing device or system 400, as described above.

Action 410 illustrates that, in one embodiment, once the browser extension 132 has been installed (e.g., unpackaged and copied at least in part to the local file system, etc.), the browser extension 132 may be launched or loaded, as described above.

Action 412 illustrates that, in one embodiment, a new execution process associated with the browser extension 132 may be started, as described above. In various embodiments, if the browser extension has been updated or changed the new execution process may be associated with the new version of the browser extension 132.

Actions 414 illustrates that, in one embodiment, that, as described above, the web browser 124 may check or be notified of any changes to the browser extensions, as described above. Action 416 illustrates that, in one embodiment, the web browser 124 may alter of change its functionality based upon the changes indicated in Action 414, as described above.

Figure 5:
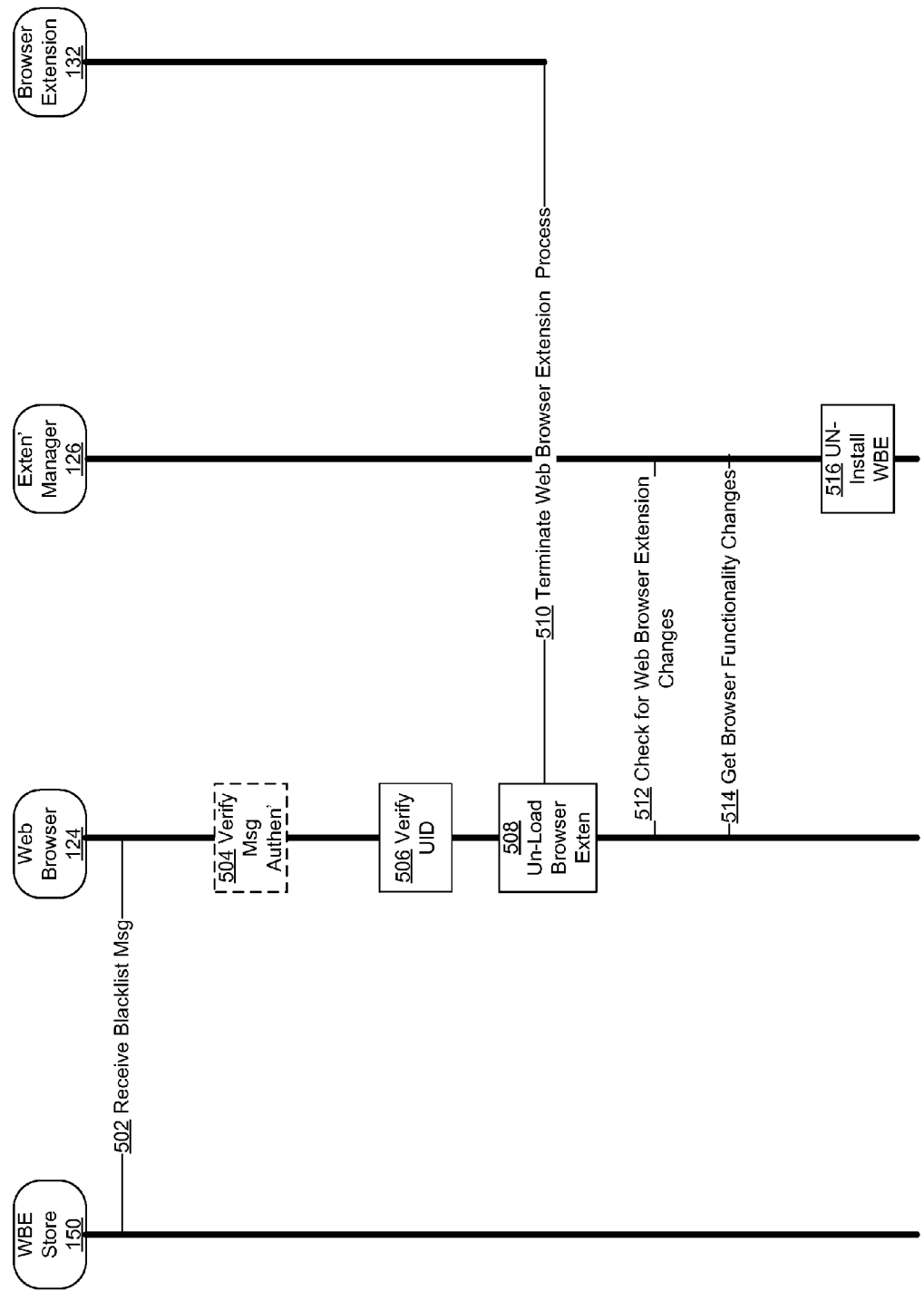
FIG. 5 is a block diagram of an example embodiment of a system in accordance with the disclosed subject matter.

FIG. 5 is a block diagram of an example embodiment of a system 500 in accordance with the disclosed subject matter. In one embodiment, the system 500 may include web browser extension store 150, a web browser 124, an extension manager 126, and at least one browser extension 132. In the illustrated embodiment, the black lines associated with each of the components of the system (e.g., web browser 124, browser extension 132, etc.) represent the execution, by a processor or a server, of an execution process associated with that component. In the illustrated embodiment, FIG. 5 shows an example embodiment of the receipt of a blacklisting message.

Action 502 illustrates that, in one embodiment, the web browser 124 may receive a blacklisting message. In various embodiments, the message may be received when the web browser 124 checks a web store 150 to determine if a new version of a browser extension 132 is available. In another embodiment, the web store 150 or other entity may broadcast the blacklisting message. In some embodiments, the blacklisting message may include one or more of the following: an instruction to either uninstall or disable a browser extension 132, a UID of the blacklisted browser extension 132, one or more versions of the browser extension 132 to which the blacklisting message applies, and a signature or authentication value to provide that the blacklisting message is genuine. It is understood that the above are merely a few illustrative examples to which the disclosed subject matter is not limited.

Action 504 illustrates that, in one embodiment, the web browser 124 or, in some embodiments, the extension manager 126, may authenticate the blacklisting message to confirm that it is genuine and not maliciously sent. Action 506 illustrates that, in one embodiment, the web browser 124 or extensions manager 126 may determine if the browser extension 132 identified by the UID included in the blacklisting message is installed on the computing device or system 500. In various embodiments, the web browser 124 or extensions manager 126 may determine whether or not the installed version of the browser extension 132 is the subject of the blacklisting message. As described above, the blacklisting message may apply to all versions of a particular browser extension 132.

Action 508 illustrates that, in one embodiment, if these conditions are met, depending upon the conditions of the embodiment, the browser extension 132 may be un-loaded, or disabled. Action 510 illustrates that, in one embodiment, the browser extension 132's execution process may be terminated, as described above.

Actions 512 illustrates that, in one embodiment, that, as described above, the web browser 124 may check or be notified of any changes to the browser extensions, as described above. Action 514 illustrates that, in one embodiment, the web browser 124 may alter of change its functionality based upon the changes indicated in Action 512, as described above.

Action 516 illustrates that, in one embodiment, the browser extension 132 may be uninstalled or removed from the computing device or system 500. In such an embodiment, the files associated with the browser extension 132 (e.g., web pages, a manifest, etc.) may be removed or deleted from the computing device or system 500. In some embodiments, the extensions manager 126 or web browser 124 may add the UID of the browser extension 132 to a list of browser extensions that may not be installed. It is understood that the above is merely one illustrative example to which the disclosed subject matter is not limited.

FIG. 6 is a block diagram of an example embodiment of a portion of file 600 in accordance with the disclosed subject matter. In various embodiments, the file 600 may include a manifest of a browser extension, as described above. In various embodiments, the file 600 may include a number of fields or values. However, in the illustrated embodiment, only a portion of the possible fields, as described above, are displayed.

In one embodiment, the manifest 600 may include a UID field 602. In some embodiments, UID field 602 may include a substantially globally unique identifier (GUID or UID) associated with the browser extension. As described above, in various embodiments, the UID may include a portion of a cryptographic hash that is encoded in a way that no numeric values are used.

In one embodiment, the manifest 600 may include an update URL field 604. In such an embodiment, the update URL field 604 may include a URL of a web store or other server from which upgrades to the browser extension may be retrieved or downloaded, as described above.

In various embodiments, the manifest 600 may include a version field 606. In some embodiments, the version field 606 may include an indication of which version the current browser extension associated with the manifest is. In such an embodiment, the version field 606 may be used when checking versions for upgrading, updating, or blacklisting a browser extension.

FIG. 7 is a flow chart of an example embodiment of a technique in accordance with the disclosed subject matter. In various embodiments, the technique 700 may be used or produced by the systems such as those of FIG. 1, 3*a*, 3*b*, 4, 5, or 9. Although, it is understood that the above are merely a few illustrative examples to which the disclosed subject matter is not limited. It is understood that the disclosed subject matter is not limited to the ordering of or number of actions illustrated by technique 700.

Block 702 illustrates that, in one embodiment, processor may execute a web browser, as described above. As described above, in various embodiments, the web browser may be included as part of an operating system. In some embodiments, the web browser may be a native application that includes machine executable code and is executed with the aid of the operating system. In one embodiment, executing may include executing the web browser in at least one first execution process, as described above. In various embodiments, one or more of the action(s) illustrated by this Block may be performed by the apparatuses or systems of FIG. 1, 3*a*, 3*b*, 4, 5, or 9, the processor 110 and web browser 124 of FIG. 1, as described above.

Block 704 illustrates that, in one embodiment, the web browser may load or launch a web browser extension, as described above. In various embodiments, the web browser extension may include at least one web page configured to alter the functionality of the web browser, as described above. In some embodiments, loading may include not restarting the web browser, as described above. In one embodiment, loading the web browser extension may include executing the web browser extension in at least one second execution process, wherein the second execution process is substantially independent of the web browser's first execution process, as described above. In various embodiments, one or more of the action(s) illustrated by this Block may be performed by the apparatuses or systems of FIG. 1, 3*a*, 3*b*, 4, 5, or 9, the processor 110, the web browser 124 or the browser extension 126 of FIG. 1, as described above.

Block 706 illustrates that, in one embodiment, the web browser may dynamically re-loading or unloading the web browser extension without restarting the web browser, as described above. In one embodiment, the loading or unloading the web browser extension may cause the functionality of the web browser to change, as described above. In one embodiment, dynamically re-loading the web browser extension may include terminating an old at least one second execution process associated with the web browser extension, and starting a new at least one second execution process associated with the web browser extension, as described above. In some embodiments, dynamically unloading a web browser extension may include removing, by the web browser, any functionality provided by the un-loaded web browser extension. In various embodiments, dynamically unloading the web browser extension may include terminating the web browser extension's at least one second execution process, as described above.

In one embodiment, dynamically re-loading or unloading may include notifying the web browser of the loading or unloading of a web browser extension, determining, by the web browser, what functionality of the web browser is affected by the re-loaded/unloaded web browser extension, and altering the functionality of the web browser based upon the determined effect of the re-loaded/unloaded web browser extension, as described above. In some embodiments, altering the functionally of the web browser may include altering the user interface of the web browser based upon the re-loaded/unloaded web browser extension, as described above. In various embodiments, one or more of the action(s) illustrated by this Block may be performed by the apparatuses or systems of FIG. 1, 3*a*, 3*b*, 4, 5, or 9, the processor 110, the web browser 124 or the browser extension 126 of FIG. 1, as described above.

FIG. 8 is a flow chart of an example embodiment of a technique in accordance with the disclosed subject matter. In various embodiments, the technique 800 may be used or produced by the systems such as those of FIG. 1, 3*a*, 3*b*, 4, 5, or 9. Although, it is understood that the above are merely a few illustrative examples to which the disclosed subject matter is not limited. It is understood that the disclosed subject matter is not limited to the ordering of or number of actions illustrated by technique 800.

Block 802 illustrates that, in one embodiment, processor may execute a web browser, as described above. As described above, in various embodiments, the web browser may be included as part of an operating system. In some embodiments, the web browser may be a native application that includes machine executable code and is executed with the aid of the operating system. In one embodiment, executing may include executing the web browser in at least one first execution process, as described above. In various embodiments, one or more of the action(s) illustrated by this Block may be performed by the apparatuses or systems of FIG. 1, 3a, 3b, 4, 5, or 9, the processor 110 and web browser 124 of FIG. 1, as described above.

Block 804 illustrates that, in one embodiment, the web browser may install on the apparatus a web browser extension, as described above. In various embodiments, the web browser extension may include at least one web page configured to alter the functionality of the web browser, and a substantially unique identifier (UID) based upon a public encryption key, as described above. In some embodiments, the public encryption key includes a portion of a randomly generated public/private key pair, as described above. In various embodiments, the web browser extension's substantially UID may be configured to remain the same regardless of whether the web browser extension is hosted via a collective web browser extension store or a self-hosted web store, as described above.

In one embodiment, installing may include downloading the web browser extension from a web browser extension store via a permanent universal resource locator (URL), wherein the permanent URL is based upon the web browser extension's substantially UID, as described above. In various embodiments, the substantially unique identifier (UID) may be stored in an encoding scheme that does not use numerals, as described above.

In some embodiments, installing may include downloading the web browser extension as a packaged installable entity that is signed by a portion of a public/private encryption key pair, verifying the authentication of the web browser extension based upon the public/private encryption key, and only installing the web browser extension if the authentication of the web browser extension has been verified.

In various embodiments, installing the web browser extension may include downloading an updated version of the web browser extension as a packaged installable entity that is signed by a portion of a public/private encryption key pair, verifying the authenticity of the updated version of the web browser extension based upon a public/private encryption key signature, and determining if updated version of the web browser extension is newer than installed prior version of the web browser, as described above. In such an embodiment, installing may also include only installing the web browser extension if the authentication of the web browser extension has been verified and the updated version of the web browser extension is newer than the installed prior version of the web browser, as described above.

In some embodiments, determining if updated version of the web browser extension is newer may include comparing a version number of the updated version of the web browser extension to a version number of an installed prior version of the web browser, as described above. In such an embodiment, only installing the web browser extension if the authentication of the web browser extension has been verified and the updated version of the web browser extension is newer than the installed prior version of the web browser may include only installing the web browser extension if the authentication of the web browser extension has been verified and the version number of the updated version of the web browser extension is greater than the version number of the installed prior version of the web browser, as described above. In various embodiments, one or more of the action(s) illustrated by this Block may be performed by the apparatuses or systems of FIG. 1, 3a, 3b, 4, 5, or 9, the processor 110 and web browser 124 of FIG. 1, as described above.

Block 806 illustrates that, in one embodiment, the web browser may launch the web browser extension based upon the substantially unique identifier, as described above. In various embodiments, launching may include accessing the at least one web page via a URL that include the UID, as described above. In one embodiment, launching may include starting an execution process associated with the browser extension, as described above. In various embodiments, one or more of the action(s) illustrated by this Block may be performed by the apparatuses or systems of FIG. 1, 3a, 3b, 4, 5, or 9, the processor 110 and web browser 124 of FIG. 1, as described above.

Figure 9:
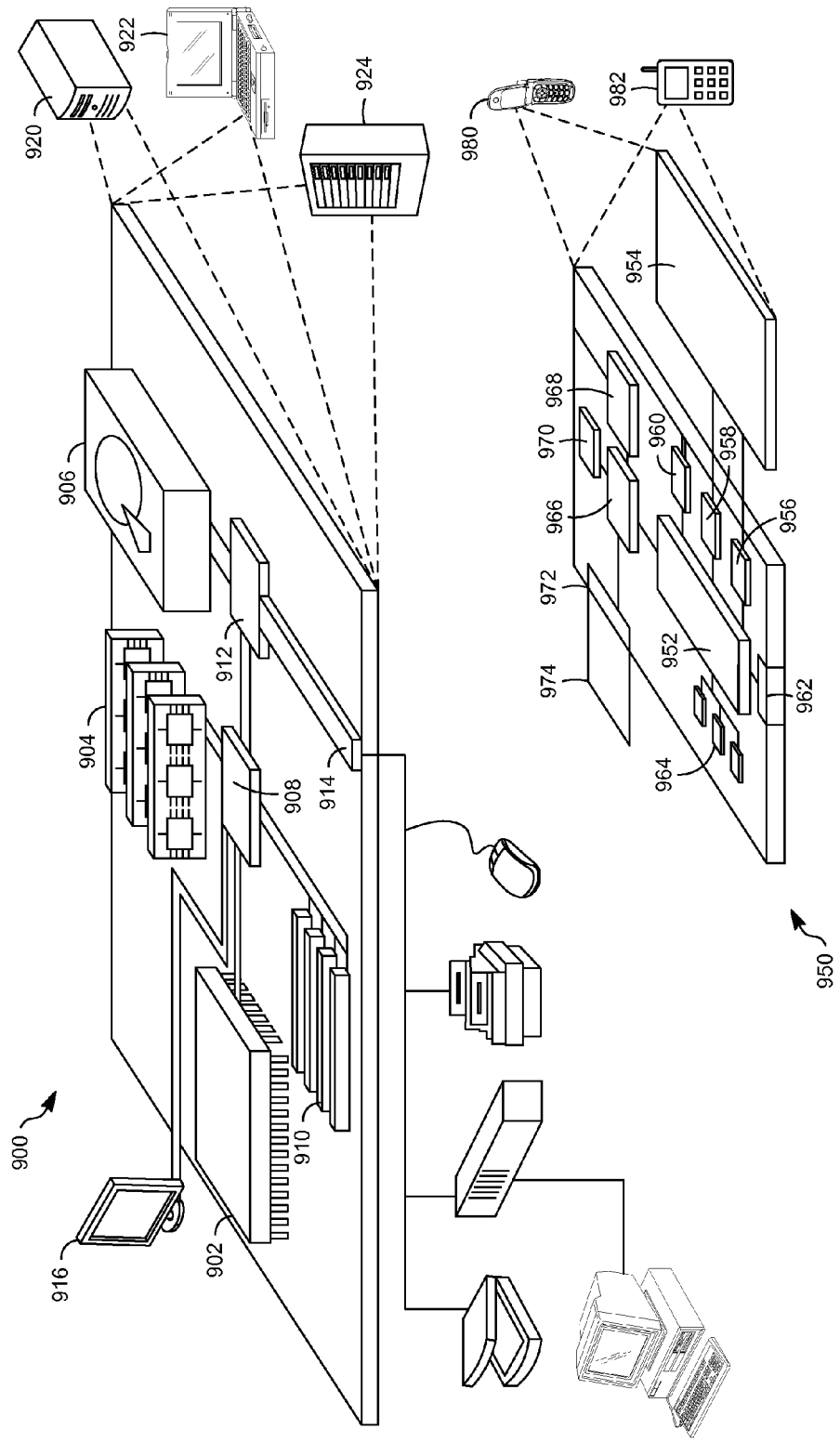
FIG. 9 is a block diagram of an example embodiment of a system in accordance with the disclosed subject matter.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   executing, by a processor included by the apparatus, a native application;
   installing on the apparatus, via the native application, an application extension, wherein the application extension is packaged as an installable entity that includes at least one web page configured to alter the functionality of the native application, and a substantially unique identifier (UID) based upon a public encryption key;
   launching, via the native application, the application extension, from a local storage medium of the apparatus, based upon an address that is based upon the substantially unique identifier; and
   verifying an updated version of the application extension based upon a public/private encryption key signature of a packaged installable entity of the updated version.

2. The method of claim 1, wherein the public encryption key includes a portion of a randomly generated public/private key pair.

3. The method of claim 1, wherein installing the application extension includes:
   downloading the application extension from an application extension store via a permanent universal resource locator (URL), wherein the permanent URL is based upon the web browser extension's substantially UID.

4. The method of claim 1, wherein the application extension's substantially UID is configured to remain the same regardless of whether the application extension is hosted via a collective application extension store or a self-hosted application extension store.

5. The method of claim 1, wherein installing on the apparatus the application extension includes:
   downloading the application extension as the installable entity that is signed by a portion of the public/private encryption key pair;
   verifying the application extension based upon the public/private encryption key; and
   only installing the application extension if the application extension has been verified.

6. The method of claim 1, wherein installing the application extension includes:
   downloading the updated version of the application extension as the packaged installable entity that is signed by a portion of a public/private encryption key pair;
   determining if the updated version of the application extension is newer than an installed prior version of the application extension; and
   only installing the application extension if the authentication of the application extension has been verified and the updated version of the application extension is newer than the installed prior version of the application extension.

7. The method of claim 6, wherein determining if updated version of the application extension is newer includes comparing a version number of the updated version of the application extension to a version number of an installed prior version of the application extension; and
   wherein only installing the application extension if the authentication of the application extension has been verified and the updated version of the application extension is newer than the installed prior version of the application extension includes:
   only installing the application extension if the authentication of the application extension has been verified and the version number of the updated version of the application extension is greater than the version number of the installed prior version of the application extension.

8. The method of claim 1, wherein the substantially unique identifier (UID) is stored in an encoding scheme that includes only alphabetic characters.

9. The method of claim 1, further including:
   receiving a blacklisting message indicating that a blacklisted application extension is to be disabled, wherein the blacklisting message identifies the blacklisted application extension by the blacklisted application extension's substantially unique identifier (UID); and
   automatically unloading the blacklisted application extension.

10. An apparatus comprising:
    a processor configured to execute a native application;
    the native application configured to:
       install on the apparatus an application extension, wherein the application extension is packaged as an installable entity that includes at least one web page configured to alter the functionality of the native application, and a substantially unique identifier (UID) based upon a public encryption key; and verify an updated version of the application extension based upon a public/private encryption key signature of a packaged installable entity of the updated version, and a storage medium configured to store the application extension's at least one web page such that the application extension's at least one web page is accessed based upon the application extension's substantially unique identifier.

11. The apparatus of claim 10, wherein the public encryption key includes a portion of a randomly generated public/private key pair.

12. The apparatus of claim 10, wherein the native application is configured to:

download the application extension from a application extension store via a permanent universal resource locator (URL), wherein the permanent URL is based upon the application extension's substantially UID.

13. The apparatus of claim 10, wherein the application extension's substantially UID is configured to remain the same regardless of whether the application extension is hosted via a collective application extension store or a self-hosted application extension store.

14. The apparatus of claim 10, wherein the native application is configured to:

download the application extension as the installable entity that is signed by a portion of a public/private encryption key pair;

verify the application extension based upon the public/private encryption key; and only install the application extension if the application extension has been verified.

15. The apparatus of claim 10, wherein the native application is configured to:

download an updated version of the application extension as the packaged installable entity that is signed by a portion of a public/private encryption key pair;

determine if updated version of the application extension is newer than installed prior version of the application extension; and only install the application extension if the application extension has been verified and the updated version of the application extension is newer than the installed prior version of the application extension.

16. The apparatus of claim 15, wherein the native application is configured to:

compare a version number of the updated version of the application extension to a version number of an installed prior version of the application extension; and only install the application extension if the authentication of the application extension has been verified and the version number of the updated version of the application extension is greater than the version number of the installed prior version of the application extension.

17. The apparatus of claim 15, wherein the substantially unique identifier (UID) is stored in an encoding scheme that does not use numerals.

18. The apparatus of claim 15, wherein the native application is configured to:

receive a blacklisting message indicating that a blacklisted application extension is to be disabled, wherein the blacklisting message identifies the blacklisted application extension by the blacklisted application extension's substantially unique identifier (UID); and automatically unloading the blacklisted application extension.

19. A method comprising:

executing, by a processor included by an apparatus, an operating system;

installing on the apparatus, via the operating system, an operating system extension, wherein the operating system extension is packaged as an installable entity that includes at least one web page configured to alter the functionality of the operating system, and a substantially unique identifier (UID) based upon a public encryption key;

launching, via the operating system, the at least one web page of the operating system extension, from a local storage medium of the apparatus, based upon an address that includes the substantially unique identifier; and verifying an updated version of the application extension based upon a public/private encryption key signature of a packaged installable entity of the updated version.

20. The method of claim 19, wherein the operating system extension's substantially UID is configured to remain the same regardless of whether the operating system extension is hosted via a collective operating system extension store or a self-hosted operating system extension store.

* * * * *